US011862047B2

United States Patent
Park et al.

(10) Patent No.: US 11,862,047 B2
(45) Date of Patent: Jan. 2, 2024

(54) DISPLAY DEVICE

(71) Applicant: Samsung Display Co., Ltd., Yongin-Si (KR)

(72) Inventors: In Soo Park, Hwaseong-si (KR); Seyong Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 320 days.

(21) Appl. No.: 17/231,491

(22) Filed: Apr. 15, 2021

(65) Prior Publication Data

US 2022/0068165 A1 Mar. 3, 2022

(30) Foreign Application Priority Data

Aug. 26, 2020 (KR) .................. 10-2020-0107977
Nov. 5, 2020 (KR) .................. 10-2020-0146721

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1681* (2013.01)

(58) Field of Classification Search
CPC .... G06F 1/1601; G06F 1/1616; G06F 1/1652; G09F 9/301
See application file for complete search history.

(56) References Cited

U.S. PATENT DOCUMENTS

| | | | |
|---|---|---|---|
| 9,250,733 B2 | 2/2016 | Lee et al. | |
| 9,348,450 B1 * | 5/2016 | Kim | H04M 1/0268 |
| 10,423,196 B2 | 9/2019 | Seo et al. | |
| 10,429,903 B2 | 10/2019 | Hong et al. | |
| 10,551,880 B1 * | 2/2020 | Ai | G06F 1/1641 |
| 10,743,430 B2 | 8/2020 | Myeong et al. | |

(Continued)

FOREIGN PATENT DOCUMENTS

| | | |
|---|---|---|
| KR | 1020160083608 A | 7/2016 |
| KR | 101726306 B1 | 4/2017 |

(Continued)

OTHER PUBLICATIONS

Extended European Search Report for Application No. 21192967.4 dated Jan. 20, 2022.

*Primary Examiner* — Anthony Q Edwards
(74) *Attorney, Agent, or Firm* — CANTOR COLBURN LLP

(57) ABSTRACT

A display device includes a display module and a folding set disposed below the display module and defining a first rotation axis and a second rotation axis, which each extend in the first direction. Here, a first axis parallel to the second direction and overlapping a first surface of the display module and a second axis perpendicular to the first surface of the display module at a center of the folding set are defined. Also, a first coordinate of the second rotation axis is determined by an equation $(G/2)+T \leq X \leq (L/2)$. Here, X denotes the first coordinate, G denotes a distance between the first non-folding area and the second non-folding area of the display module, T denotes a thickness of the display module measured with respect to the second axis, and L denotes a length of the folding area.

20 Claims, 29 Drawing Sheets

(56) References Cited

U.S. PATENT DOCUMENTS

| | | | |
|---|---|---|---|
| 11,625,120 B2* | 4/2023 | Lee | G06F 3/0445 |
| | | | 345/173 |
| 2015/0233162 A1 | 8/2015 | Lee et al. | |
| 2015/0366089 A1 | 12/2015 | Park et al. | |
| 2016/0143162 A1 | 5/2016 | Van Dijk et al. | |
| 2016/0295709 A1 | 10/2016 | Ahn | |
| 2020/0166974 A1 | 5/2020 | Ai et al. | |
| 2020/0209918 A1 | 7/2020 | Yoon et al. | |
| 2021/0034117 A1* | 2/2021 | Torres | G06F 1/1616 |
| 2023/0093986 A1* | 3/2023 | Eom | G09F 9/301 |
| | | | 361/679.27 |
| 2023/0100324 A1* | 3/2023 | Kim | C08G 73/14 |
| | | | 528/170 |

FOREIGN PATENT DOCUMENTS

| | | |
|---|---|---|
| KR | 101875855 B1 | 7/2018 |
| KR | 1020190082357 A | 7/2019 |
| KR | 1020200083744 A | 7/2020 |
| WO | 2020138540 A1 | 7/2020 |

\* cited by examiner

DISPLAY DEVICE

This application claims priority to Korean Patent Application No. 10-2020-0107977, filed on Aug. 26, 2020, and Korean Patent Application No. 10-2020-0146721, filed on Nov. 5, 2020, and all the benefits accruing therefrom under 35 U.S.C. § 119, the content of which in their entirety is herein incorporated by reference.

BACKGROUND

1. Field

Embodiments of the invention herein relate to a display device, and more particularly, to a foldable display device.

2. Description of the Related Art

An electronic device that provides an image to a user, e.g., a smartphone, a digital camera, a laptop computer, a navigation unit, and a smart television, includes a display device for displaying an image. The display device generates an image to provide the generated image to the user through a display screen.

In recent years, as technologies of the display device are developed, various types of display devices are being developed. Various flexible display devices that are deformable, foldable, and rollable into a curved shape have been developed, for example. The flexible display devices that are deformable into various shapes may be portable and thus increase convenience of the user.

A foldable display device among the flexible display devices includes a display module foldable with respect to a folding axis extending in one direction. The display module is folded or unfolded with respect to the folding axis. The display module includes a folding area that is bent during a folding operation.

SUMMARY

Embodiments of the invention provide a display device including a hinge for folding a display module into a dumbbell shape.

An embodiment of the invention provides a display device including a display module including a first non-folding area, a second non-folding area, and a folding area between the first and second non-folding areas, and a folding set disposed on a first surface of the display module and defining a first rotation axis and a second rotation axis, which each extend in a first direction. Here, the folding area and the first and second non-folding areas are arranged in a second direction crossing the first direction, and a first axis parallel to the second direction and overlapping a second surface of the display module opposite to first surface of the display module and a second axis perpendicular to the surface of the display module at a center of the folding set are defined. Also, a first coordinate of the second rotation axis is determined by an equation $(G/2)+T \leq X \leq (L/2)$. Here, X denotes the first coordinate, G denotes a distance between the first non-folding area and the second non-folding area when the display module is folded, the T denotes a thickness of the display module measured with respect to the second axis, and L denotes a length of the folding area with respect to the second direction.

In an embodiment of the invention, a display device includes a display module including a first non-folding area, a folding area, and a second non-folding area, which are arranged in a second direction crossing a first direction, and a folding set disposed on a first surface of the display module and defining a first rotation axis and a second rotation axis, which each extend in the first direction and are spaced apart from each other in the second direction. Here, a first axis parallel to the second direction and overlapping a second surface of the display module opposite to the first surface of the display module and a second axis perpendicular to the surface of the display module at a center of the folding set are defined, and the first rotation axis is symmetrical to the second rotation axis with respect to the second axis. Also, a first coordinate and a second coordinate of the second rotation axis are determined by equations $(G/2)+T \leq X \leq (L/2)$, and $Y=-X+(G/2)$. Here, G denotes a distance between the first non-folding area and the second non-folding area when the display module is folded, T denotes a thickness of the display module measured with respect to the second axis, L denotes a length of the folding area with respect to the second direction, and Y denotes the second coordinate.

BRIEF DESCRIPTION

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
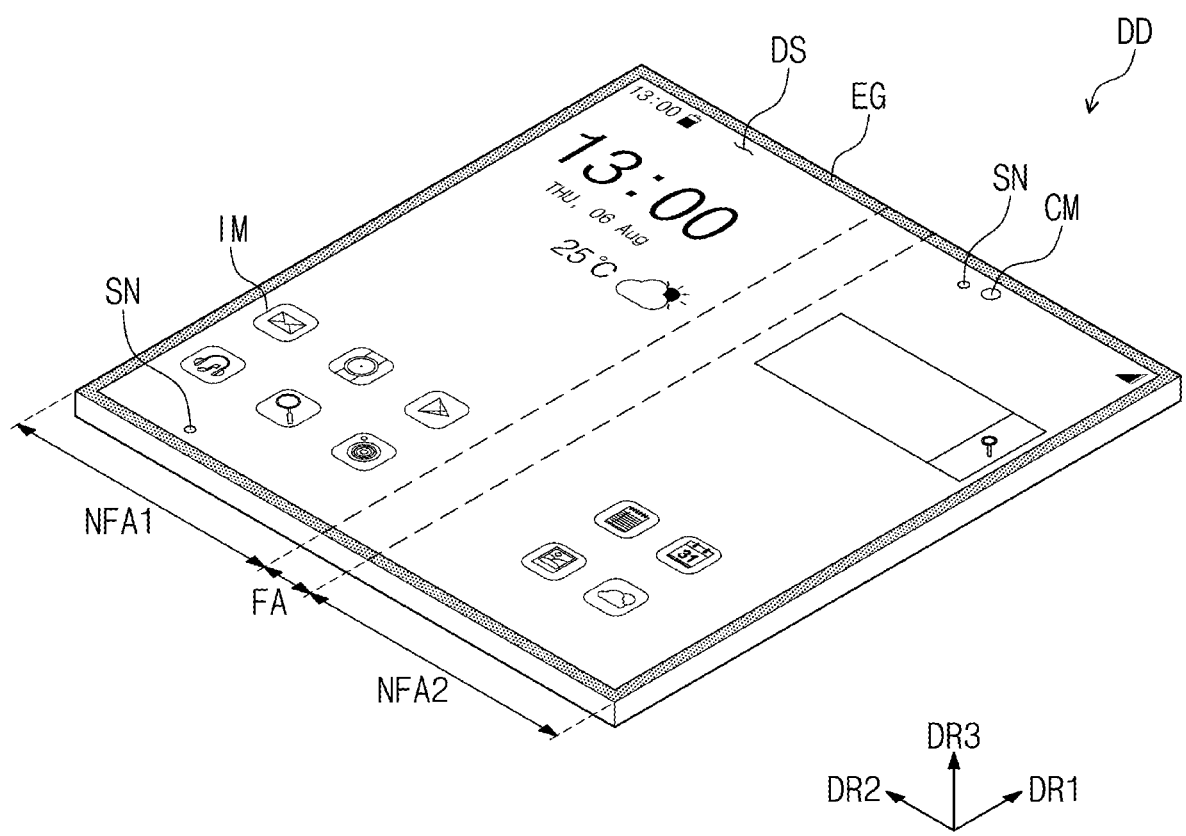
FIG. 1 is a perspective view illustrating an embodiment of a display device according to the invention.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the drawing figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, embodiments of the invention will be described in detail with reference to the accompanying drawings.

Figure 2:
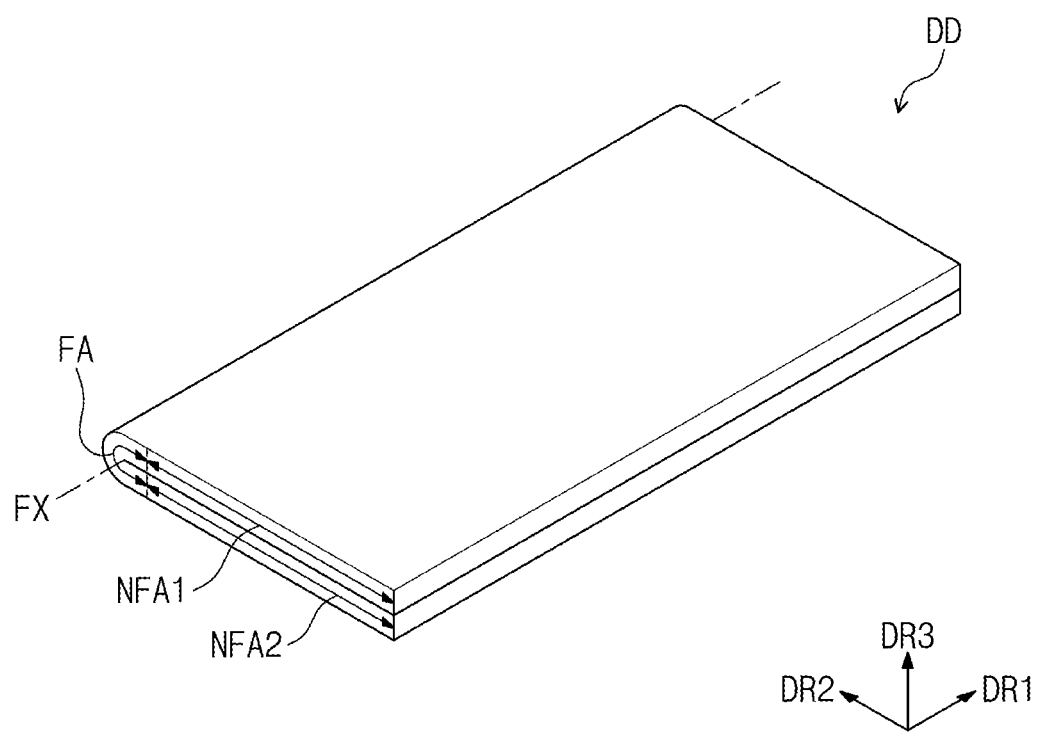
FIG. 2 is a view illustrating a folded state of the display device in FIG. 1.

FIG. 1 is a perspective view illustrating an embodiment of a display device according to the invention. FIG. 2 is a view illustrating a folded state of the display device in FIG. 1.

Referring to FIG. 1, a display device DD in an embodiment of the invention may have a quadrangular (e.g., rectangular) shape including long sides each extending in a first direction DR1 and short sides each extending in a second direction DR2 crossing the first direction DR1. However, the invention is not limited thereto. In an embodiment, the display device DD may have various shapes such as a circular shape or a polygonal shape, for example. The display device DD may be a flexible display device.

Hereinafter, a direction that crosses a plane defined by the first and second directions DR1 and DR2 in a substantially perpendicular manner is defined as a third direction DR3. In this specification, an expression "in a plan view" may be defined as a state viewed in the third direction DR3.

The display device DD may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged in the second direction DR2.

Although one folding area FA and two non-folding areas NFA1 and NFA2 are illustrated, the invention is not limited to the number of each of the folding area FA and the non-folding areas NFA1 and NFA2. In an embodiment, the display device DD may include two or more plurality of non-folding areas with a plurality of folding areas disposed therebetween, for example.

A top surface of the display device DD may be defined as a display surface DS, and the display surface DS have a plane defined by the first direction DR1 and the second direction DR2. Images IM generated from the display device DD may be provided to a user through the display surface DS.

An edge part EG may be disposed around the display surface DS. The edge part EG may not display an image. The edge part EG may surround the display surface DS and define an edge of the display device DD, which is printed by a predetermined color.

The display device DD may include a plurality of sensors SN and at least one camera CM. Each of the sensors SN and the camera CM may be disposed adjacent to the edge of the display device DD. Each of the sensors SN and the camera CM may be disposed on the display surface DS adjacent to the edge part EG. Each of the sensors SN and the camera CM may be disposed on the first and second non-folding areas NFA1 and NFA2.

In an embodiment, each of the sensors SN may be a proximity sensor, for example. However, the invention is not limited to the kind of the sensors SN. The camera CM may photograph an external image.

Referring to FIG. 2, the display device DD may be a folding-type (foldable) display device DD that is folded or unfolded. In an embodiment, the display device DD may be folded such that the folding area FA is bent with respect to a folding axis FX parallel to the first direction DR1, for example. The folding axis FX may be defined as a major axis parallel to the long side of the display device DD.

When the display device DD is folded, the first non-folding area NFA1 and the second non-folding area NFA2 may face each other, and the display device DD may be in-folded so that the display surface DS is not exposed to the outside.

Figure 3:
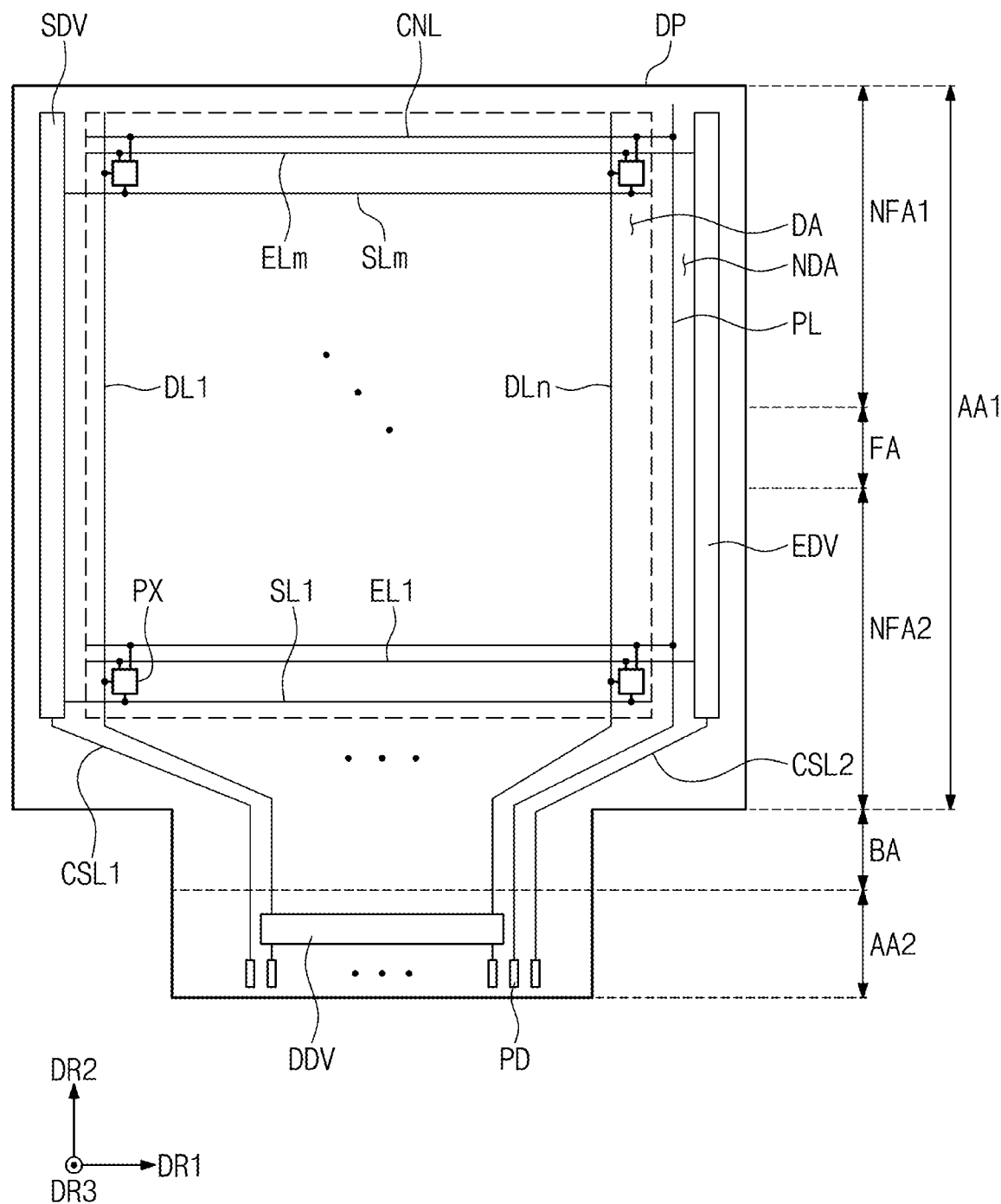
FIG. 3 is a plan view illustrating the display device in FIG. 1.

FIG. 3 is a plan view illustrating the display device in FIG. 1.

Referring to FIG. 3, the display device DD may include a display panel DP, a scan driver SDV, a data driver DDV, and an emission driver EDV.

The display panel DP may include a first area AA1, a second area AA2, and a bending area BA disposed between the first area AA1 and the second area AA2. The bending area BA may extend in the first direction DR1, and the first area AA1, the bending area BA, and the second area AA2 may be arranged in the second direction DR2.

The first area AA1 may include a display area DA and a non-display area NDA disposed around the display area DA. The non-display area NDA may surround the display area DA. The display area DA may display an image, and the non-display area NDA may not display an image. Each of the second area AA2 and the bending area BA may not display an image.

When viewed in the first direction DR1, the first area AA1 may include a first non-folding area NFA1, a second non-folding area NFA2, and a folding area FA disposed between the first non-folding area NFA1 and the second non-folding area NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, connection lines CNL, and a plurality of pads PD. Here, m and n are natural numbers. The pixels PX may be disposed on the display area DA and connected to the scan lines SL1 to SLm, the data lines DL1 to DLn, and the emission lines EL1 to ELm.

The scan driver SDV and the emission driver EDV may be disposed on the non-display area NDA. Each of the scan driver SDV and the emission driver EDV may be disposed on the non-display area NDA disposed adjacent to each of both sides, which are opposite to each other in the first direction DR1, of the first area AA1. The data driver DDV may be disposed on the second area AA2. The data driver DDV may be manufactured in a form of an integrated circuit ("IC") chip and disposed (e.g., mounted) on the second area AA2.

The scan lines SL1 to SLm may each extend in the first direction DR1 and be connected to the scan driver SDV. The data lines DL1 to DLn may each extend in the second direction DR2 and be connected to the data driver DDV through the bending area BA. The emission lines EL1 to Elm may each extend in the first direction DR1 and be connected to the emission driver EDV.

The power line PL may extend in the second direction DR2 and be disposed on the non-display area NDA. Although the power line PL may be disposed between the display area DA and the emission driver EDV, the invention is not limited thereto. In an embodiment, the power line PL may be disposed between the display area DA and the scan driver SDV, for example.

The power line PL may extend to the second area AA2 through the bending area BA. In a plan view, the power line PL may extend toward a lower end of the second area AA2. The power line PL may receive a driving voltage.

The connection lines CNL may each extend in the first direction DR1 and be arranged in the second direction DR2. The connection lines CNL may be connected to the power line PL and the pixels PX. The driving voltage may be applied to the pixels PX through the power line PL and the connection lines CNL, which are connected to each other.

The first control line CSL1 may be connected to the scan driver SDV and extend toward the lower end of the second area AA2 through the bending area BA. The second control line CSL2 may be connected to the emission driver EDV and extend toward the lower end of the second area AA2 through the bending area BA. The data driver DDV may be disposed between the first control line CSL1 and the second control line CSL2.

When viewed from the plane, the pads PD may be disposed adjacent to the lower end of the second area AA2. The data driver DDV, the power line PL, the first control line CSL1, and the second control line CSL2 may be connected to the pads PD.

The data lines DL1 to DLn may be connected to the corresponding pads PD through the data driver DDV. In an embodiment, the data lines DL1 to DLn may be connected to the data driver DDV, and the data driver DDV may be connected to the pads PD that correspond to the data lines DL1 to DLn, respectively, for example.

Although not shown, a printed circuit board ("PCB") connected to the pads PD may be provided. A timing controller and a voltage generation part may be disposed on the PCB. The timing controller may be manufactured in a form of an IC chip and disposed (e.g., mounted) to the PCB. The timing controller and the voltage generation part may be connected to the corresponding pads PD through the PCB.

The timing controller may control an operation of each of the scan driver SDV, the data driver DDV, and the emission driver EDV. The timing controller may generate a scan control signal, a data control signal, and an emission control signal in response to control signals received from the outside. The voltage generation part may generate the driving voltage.

The scan control signal may be provided to the scan driver SDV through the first control line CSL1. The emission control signal may be provided to the emission driver EDV through the second control line CSL2. The data control signal may be provided to the data driver DDV. The timing controller may receive image signals from the outside and convert a data format of the image signals to match with interface specifications with the data driver DDV, thereby providing the converted image signals to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. The pixels PX may have an emission time that is controlled by the emission signals.

Although not shown, as the bending area BA is bent, the second area AA2 may be disposed below the first area AA1. Thus, the data driver DDV may be disposed below the first area AA1 not to be recognized from the outside.

Figure 4:
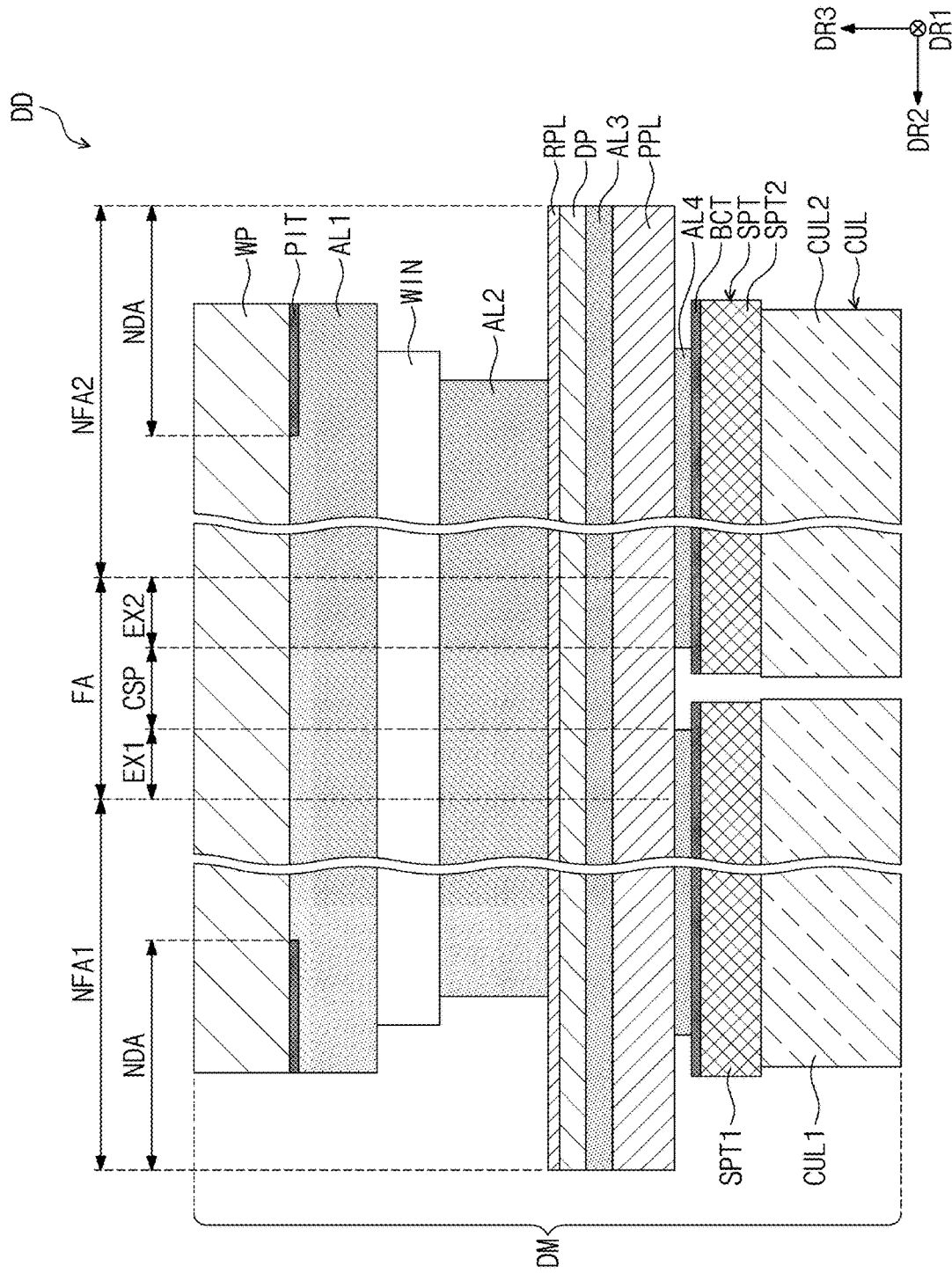
FIG. 4 is a schematic cross-sectional view illustrating the display device in FIG. 1.

FIG. 4 is a schematic cross-sectional view illustrating the display device in FIG. 1.

Although a cross-section of the display device DD in the first direction DR1 is illustrated in FIG. 4, a cross-section of each of the bending area BA and the second area AA2 is omitted for convenience of description.

Referring to FIG. 4, the display device DD may include a display module DM. The display module DM may be a flexible display module. The display device DD may include a folding set for supporting and folding eh display module DM. A structure of the folding set will be illustrated in FIG. 7 below.

The display module DM may include a first non-folding area NFA1, a folding area FA, and a second non-folding area NFA2, which are arranged in the second direction DR2, like the display device DD. The folding area FA may include a curved part CSP, a first extension part EX1 disposed between the curved part CSP and the first non-folding area NFA1, and a second extension part EX2 disposed between the curved part CSP and the second non-folding area NFA2. Each of the first extension part EX1 and the second extension part EX2 may extend from the curved part CSP.

The display module DM may include a display panel DP, an anti-reflection layer RPL, a window WIN, a window protection layer WP, a panel protection layer PPL, a printed layer PIT, a support plate SPT, a cushion layer CUL, and a coating layer BCT.

The display panel DP in an embodiment of the invention may be a light emitting display panel. In an embodiment, the display panel DP may be an organic light emitting display panel or a quantum dot light emitting display panel, for example. The organic light emitting display panel may include a light emitting layer including an organic light emitting material. The quantum dot light emitting display panel may include a light emitting layer including a quantum dot or a quantum rod. Hereinafter, the display panel DP will be described as the organic light emitting display panel.

The display panel DP may be a flexible display panel. The display panel DP may include a first non-folding area NFA1, a folding area FA, and a second non-folding area NFA2, which are arranged in the second direction DR2, like the display module DM. Also, the folding area FA of the display panel DP may include a curved part CSP, a first extension part EX1, and a second extension part EX2 like the display module DM. The display panel DP may include a plurality of pixels for displaying an image. The pixels may include organic light emitting devices.

The anti-reflection layer RPL may be disposed on the display panel DP. The anti-reflection layer RPL may be disposed directly on a top surface of the display panel DP. However, the invention is not limited thereto. In an embodiment, the anti-reflection layer RPL may be manufactured as a separate panel and attached to the display panel DP by an adhesive, for example.

The anti-reflection layer RPL may be defined as an external light reflection preventing film. The anti-reflection layer RPL may reduce a reflectance of external light incident to the display panel DP from above the display device DD.

When the external light traveling toward the display panel DP is reflected by the display panel DP and re-provided to an external user, the user may recognize the external light like a mirror. In order to prevent the above-described phenomenon, the anti-reflection layer RPL may include a plurality of color filters displaying the same color as the pixels.

The color filters may filter the external light into the same color as the pixels. In this case, the external light may not be recognized by the user. However, the invention is not limited thereto. In an embodiment, the anti-reflection layer RPL may include a phase retarder and/or a polarizer, for example.

The window WIN may be disposed on the anti-reflection layer RPL. The window WIN may protect the display panel DP and the anti-reflection layer RPL from external scratches. The window WIN may have an optically clear property. The window WIN may include glass. In an embodiment, the window WIN may be defined as ultra-thin glass ("UTG"), for example. However, the invention is not limited thereto. In an embodiment, the window WIN may include a synthetic resin film, for example.

The window protection layer WP may be disposed on the window WIN. The window protection layer WP may protect the window WIN. In an embodiment, the window protection layer WP may include a flexible plastic material such as polyimide ("PI") or polyethylene terephthalate ("PET"), for example. Although not shown, a hard coating layer may be further disposed on the window protection layer WP. Also, an anti-fingerprint layer or an anti-scattering layer, which is defined as a functional layer, may be further disposed on the window protection layer WP.

The panel protection layer PPL may be disposed below the display panel DP. The panel protection layer PPL may protect a lower portion of the display panel DP. The panel protection layer PPL may include a flexible plastic material. In an embodiment, the panel protection layer PPL may include PET, for example.

The support plate SPT may be disposed below the panel protection layer PPL. The support plate SPT may include a metal material such as stainless steel. Although the support plate SPT may include STS316 as an example, the invention is not limited thereto. In an embodiment, the support plate SPT may include various metal materials, for example.

The support plate SPT may support the display panel DP. In an embodiment, the support plate SPT may have a thickness of about 40 micrometers (µm) or less, for example. A heat dissipation performance of the display device DD may improve by the support plate SPT.

The support plate SPT may include a first support plate SPT1 disposed on the first non-folding area NFA1 and a second support plate SPT2 disposed on the second non-folding area NFA2. The support plate SPT may not be disposed on the folding area FA.

The cushion layer CUL may be disposed below the support plate SPT. The cushion layer CUL may absorb an external impact applied to a lower portion of the display module DM to protect the display module DM. The cushion layer CUL may include a foam sheet having a predetermined elastic force. In an embodiment, the cushion layer CUL may include a foam, a sponge, polyurethane, or thermoplastic polyurethane, for example.

The cushion layer CUL may include a first cushion layer CUL1 disposed below the first support plate SPT1 and a second cushion layer CUL2 disposed below the second support plate SPT2. The cushion layer CUL may not be disposed on the folding area FA.

The coating layer BCT may be disposed between the panel protection layer PPL and the support plate SPT. The coating layer BCT may be applied to a top surface of the first support plate SPT1 and a top surface of the second support plate SPT2. The coating layer BCT may include a material having a black color. The coating layer BCT may prevent structures disposed therebelow from being recognized from thereabove.

The display device DD may include first to fourth adhesive layers AL1 to AL4. The first adhesive layer AL1 may be disposed between the window protection layer WP and the window WIN. The second adhesive layer AL2 may be disposed between the window WIN and the anti-reflection layer RPL.

The third adhesive layer AL3 may be disposed between the display panel DP and the panel protection layer PPL. The fourth adhesive layer AL4 may be disposed between the panel protection layer PPL and the support plate SPT. Specifically, the fourth adhesive layer AL4 may be disposed between the panel protection layer PPL and the coating layer BCT.

In an embodiment, each of the first to fourth adhesive layers AL1 to AL4 may include a transparent adhesive such as a pressure sensitive adhesive ("PSA") or an optically clear adhesive ("OCA").

The window protection layer WP and the window WIN may be bonded to each other by the first adhesive layer AL1. The window WIN and the anti-reflection layer RPL may be bonded to each other by the second adhesive layer AL2.

The display panel DP and the panel protection layer PPL may be bonded to each other by the third adhesive layer AL3. The panel protection layer PPL and the support plate SPT may be bonded to each other by the fourth adhesive layer AL4. Specifically, the panel protection layer PPL may be bonded to the coating layer BCT by the fourth adhesive layer AL4.

The printed layer PIT may be disposed on a bottom surface of the window protection layer WP. The printed layer PIT may overlap the non-display area NDA in the plan view. The first adhesive layer AL1 may be disposed below the window protection layer WP to cover the printed layer PIT. Although the printed layer PIT may have a black color as an example, the invention is not limited thereto. In an embodiment, the printed layer PIT may have various colors, for example.

When viewed in the plan view, the fourth adhesive layer AL4 may overlap the first and second non-folding areas NFA1 and NFA2. Also, in the plan view, the fourth adhesive layer AL4 may overlap the first and second extension parts EX1 and EX2 and may not overlap the curved part CSP. Thus, the first and second support plates SPT1 and SPT2 may be attached to the first and second non-folding areas NFA1 and NFA2 and the first and second extension parts EX1 and EX2 and may not be attached to the curved part CSP.

In an embodiment, in terms of the third direction DR3, the window WIN may have a thickness greater than about 30 μm and less than about 80 μm, and the window protection layer WP may have a thickness in a range from about 55 μm to about 100 μm, for example. In an embodiment, in terms of the third direction DR3, the support plate SPT may have a thickness in a range from about 80 μm to about 150 μm.

In terms of the first direction DR1 and the second direction DR2, the window protection layer WP may have a width greater than that of the window WIN. In terms of the first direction DR1 and the second direction DR2, each of the display panel DP, the anti-reflection layer RPL, and the panel protection layer PPL may have a width greater than that of the window protection layer WP.

In terms of the first direction DR1 and the second direction DR2, the display panel DP, the anti-reflection layer RPL, and the panel protection layer PPL may have the same width as each other. In terms of the first direction DR1 and the second direction DR2, the first adhesive layer AL1 may have the same width as the window protection layer WP, and the second adhesive layer AL2 may have a width less than that of the window WIN.

Since the window WIN and the second adhesive layer AL2 have different widths from each other, a stepped structure may be provided between the window protection layer WP and the display panel DP due to the different widths therebetween. The window protection layer WP may have a thickness enough to prevent the stepped structure from being recognized from the outside. In an embodiment, when the window protection layer WP has a thickness in a range from about 55 μm to about 100 μm, the stepped structure may not be recognized from the outside, for example.

When viewed in the plan view, the first and second support plates SPT1 and SPT2 and the first and second cushion layers CUL1 and CUL2 may be disposed at inner side more than an edge of the display panel DP.

Figure 5:
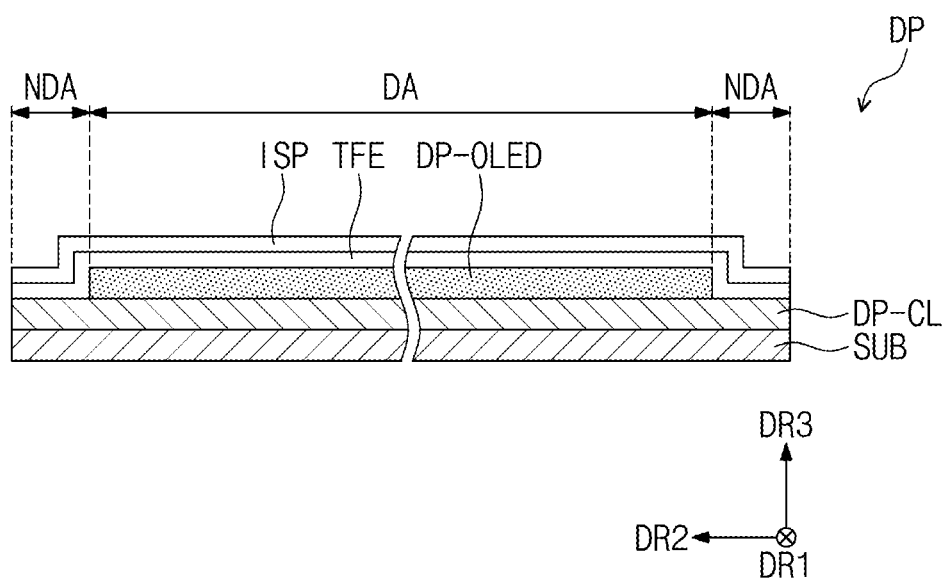
FIG. 5 is a cross-sectional view illustrating a display panel in FIG. 4.

FIG. 5 is a cross-sectional view illustrating the display panel in FIG. 4.

Referring to FIG. 5, the display panel DP may include a substrate SUB, a circuit device layer DP-CL disposed on the substrate SUB, a display device layer DP-OLED disposed on the circuit device layer DP-CL, a thin-film encapsulation layer TFE disposed on the display device layer DP-OLED, and an input sensing part ISP disposed on the thin-film encapsulation layer TFE.

The substrate SUB may include a display area DA and a non-display area NDA disposed around the display area DA. The substrate SUB may include a flexible plastic material. In an embodiment, the substrate SUB may include PI. The display device layer DP-OLED may be disposed on the display area DA, for example.

The circuit device layer DP-CL may include an insulation layer, a semiconductor pattern, a conductive pattern, and a signal line. Each of an insulation layer, a semiconductor layer, and a conductive layer may be provided on the substrate SUB through a method such as coating and deposition. Thereafter, the insulation layer, the semiconductor layer, and the conductive layer may be selectively patterned through a plurality of photolithography processes to provide a semiconductor pattern, a conductive pattern, and a signal line.

The circuit device layer DP-CL may include a transistor constituted by the semiconductor pattern, the conductive pattern, and the signal line. The display device layer DP- OLED may include light emitting devices connected to the transistors. The pixels PX may include the transistors and the light emitting devices.

The thin-film encapsulation layer TFE may be disposed on the circuit device layer DP-CL to cover the display device layer DP-OLED. The thin-film encapsulation layer TFE may include an inorganic layer, an organic layer, and an inorganic layer, which are sequentially laminated with each other. The inorganic layers may include an inorganic material to protect the pixels PX from moisture/oxygen. The organic layer may include an organic material to protect the pixels PX from foreign substances such as dust particles.

The input sensing part ISP may include a plurality of sensors (not shown) for sensing an external input. The sensors may sense the external input by a capacitive method. The external input may include various types of inputs such as a portion of a user's body, light, heat, a pen, or pressure.

The input sensing part ISP may be manufactured directly on the thin-film encapsulation layer TFE when the display panel DP is manufactured. However, the invention is not limited thereto. In an embodiment, the input sensing part ISP may be manufactured as a panel separated from the display panel DP and then attached to the display panel DP by an adhesive layer, for example.

Figure 6:
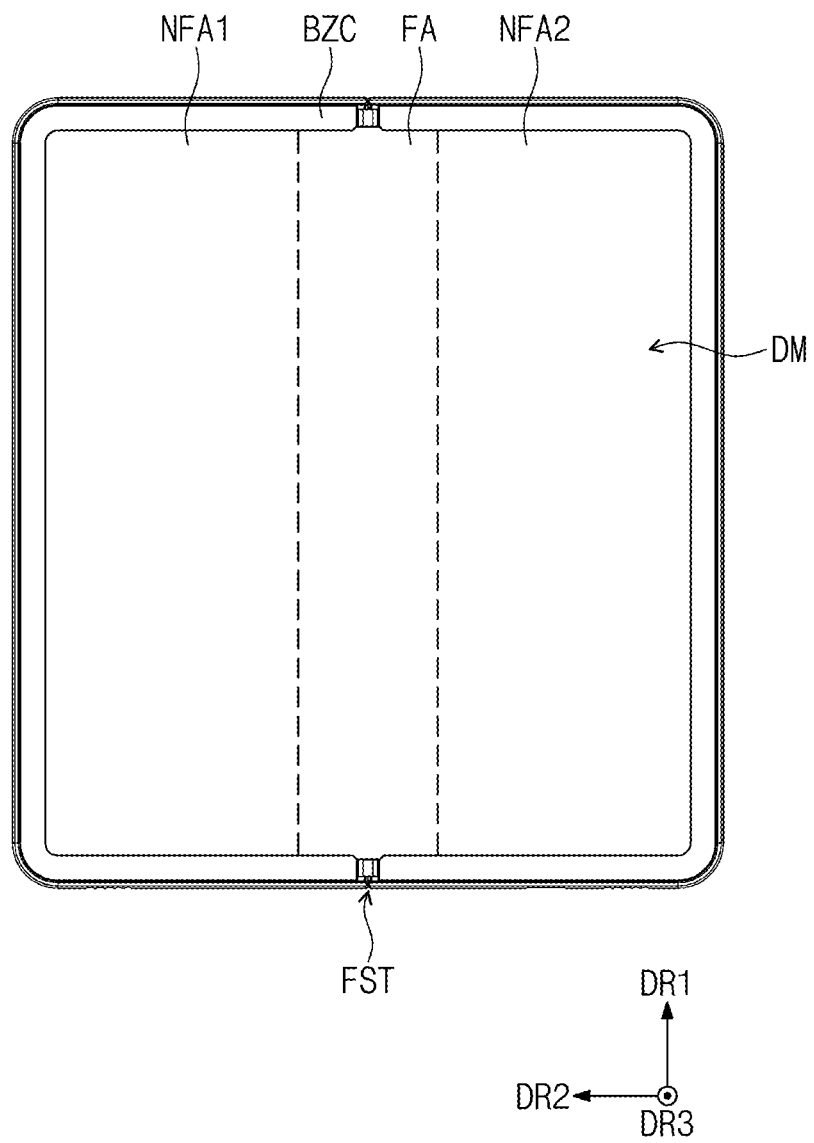
FIG. 6 is a plan view illustrating the display device of FIG. 1 in more detail.
Figure 7:
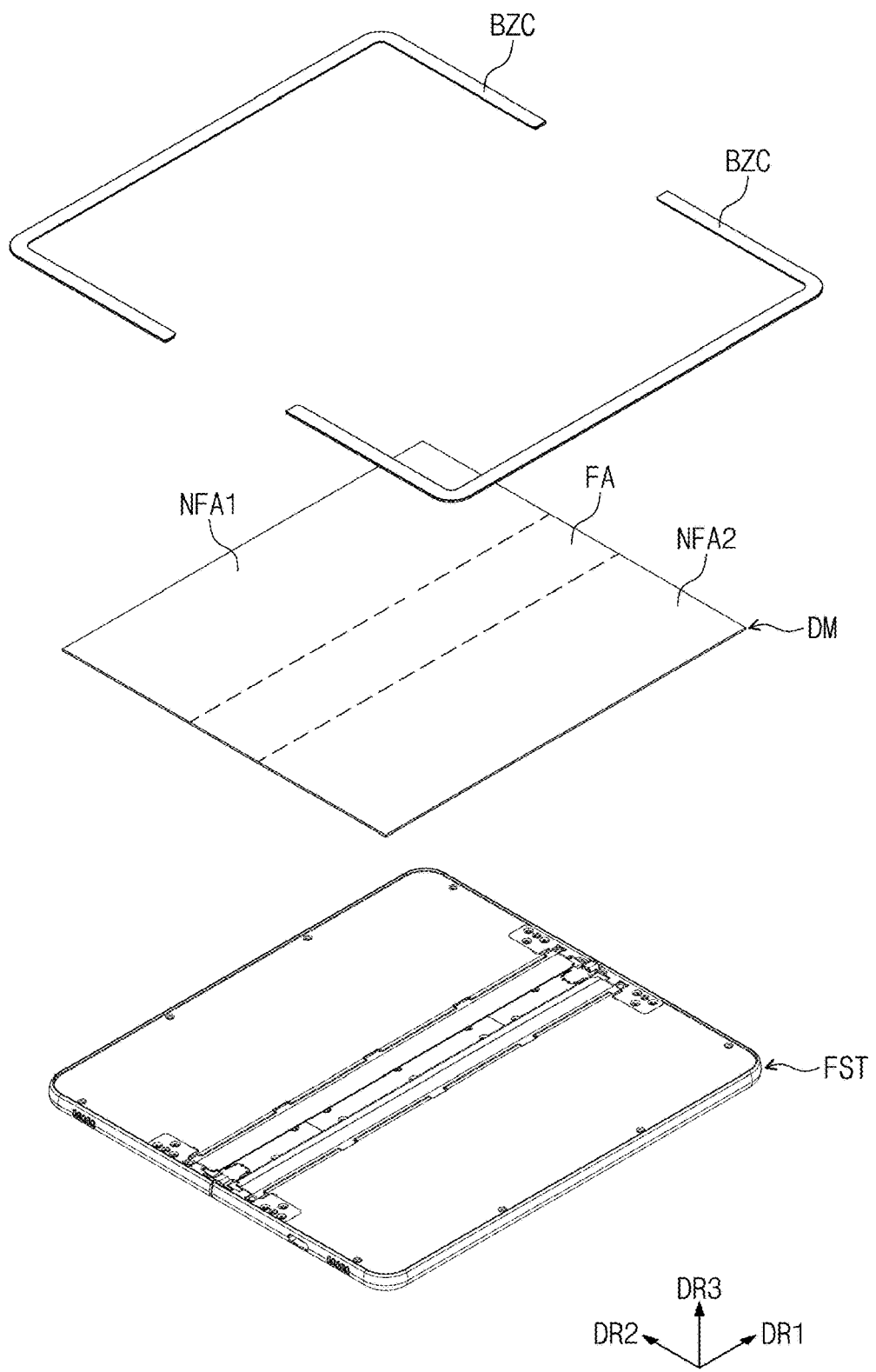
FIG. 7 is an exploded perspective view illustrating the display device in FIG. 6.

FIG. 6 is a plan view illustrating the display device of FIG. 1 in more detail. FIG. 7 is an exploded perspective view illustrating the display device in FIG. 6.

Referring to FIGS. 6 and 7, the display device DD may include a display module DM, a bezel cover BZC disposed around the display module DM, and a folding set FST disposed below the display module DM and the bezel cover BZC.

The bezel cover BZC may be disposed around first and second non-folding areas NFA1 and NFA2 of the display module DM. The bezel cover BZC may surround the first and second non-folding areas NFA1 and NFA2 of the display module DM. Although the bezel cover BZC may have a black color, the invention is not limited to the color of the bezel cover BZC. The edge part EG of the display device DD in FIG. 1 may include the bezel cover BZC.

The folding set FST may be disposed below the display module DM and the bezel cover BZC to support the display module DM and the bezel cover BZC. The folding set FST may be parallel to the first direction DR1 and folded with respect to a biaxial folding axis overlapping the folding area FA in the plan view to fold the display module DM. The above-described configuration will be described below in detail.

Although not shown in FIG. 7, the display module DM and the bezel cover BZC may be attached to the folding set FST by an adhesive.

Figure 8:
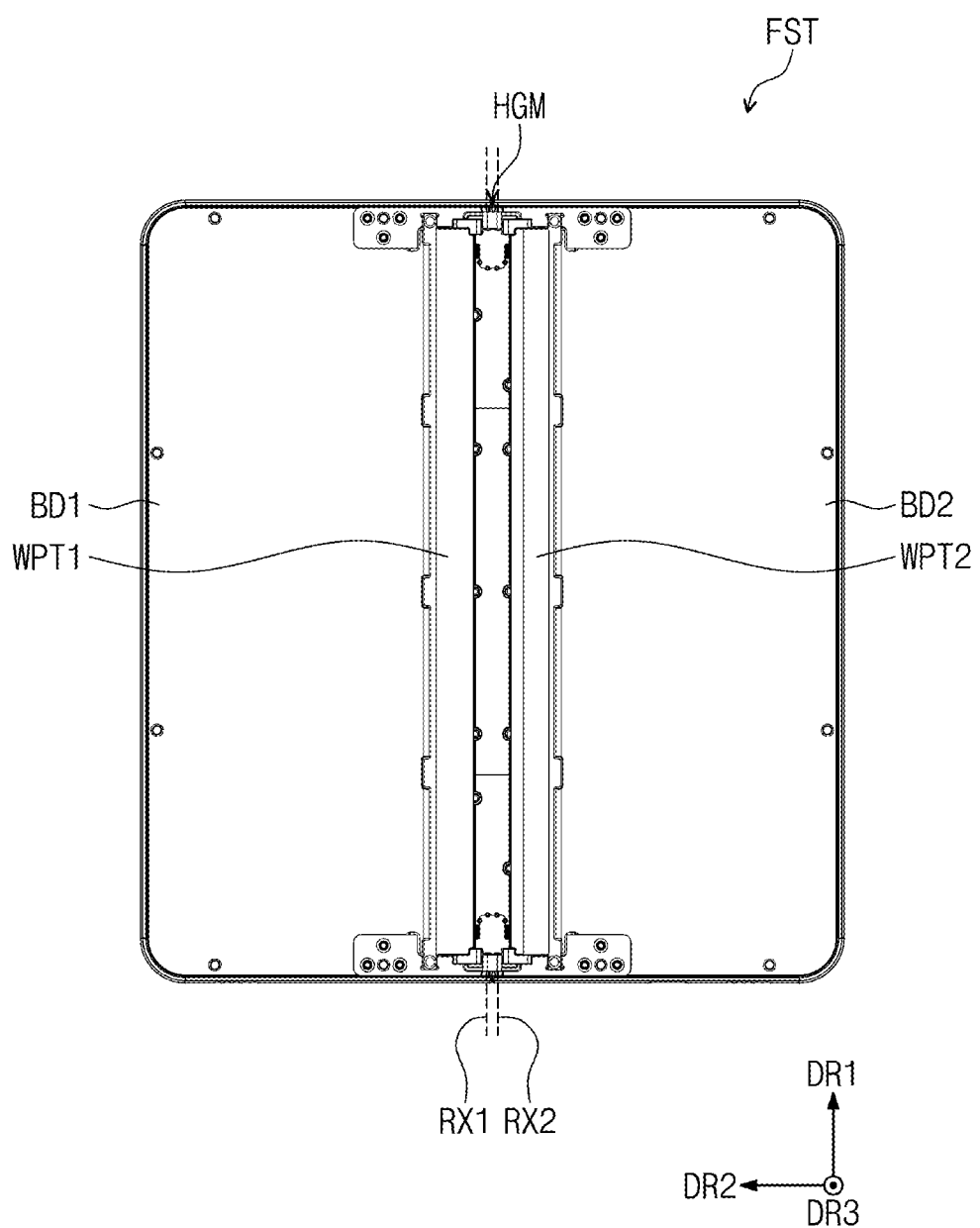
FIG. 8 is a plan view illustrating a folding set in FIG. 7.

FIG. 8 is a plan view illustrating the folding set in FIG. 7.

Referring to FIG. 8, the folding set FST may include a first body BD1, a second body BD2, a hinge module HGM, a first wing plate WPT1, and a second wing plate WPT2. The first body BD1 and the second body BD2 may be arranged in the second direction DR2. Each of the first body BD1 and the second body BD2 may have a flat surface defined by the first and second directions DR1 and DR2. The first body BD1 and the second body BD2 may have shapes that are symmetrical to each other in the second direction DR2.

The hinge module HGM may be disposed between the first body BD1 and the second body BD2. The hinge module HGM may be connected to both sides of the first body BD1, which are opposite to each other in the first direction DR1, and both sides of the second body BD2, which are opposite to each other in the first direction DR1. The hinge module HGM may be connected to the first and second bodies BD1 and BD2 and provide biaxial rotation axes RX1 and RX2 to the first and second bodies BD1 and BD2, respectively.

The biaxial rotation axes RX1 and RX2 may each extend in the first direction DR1 and be spaced apart from each other in the second direction DR2. The biaxial rotation axes RX1 and RX2 may include a first rotation axis RX1 and a second rotation axis RX2, respectively, which are spaced apart from each other in the second direction DR2 and extend in the first direction DR1. The first and second rotation axes RX1 and RX2 may define the folding axis FX in FIG. 2.

The first wing plate WPT1 and the second wing plate WPT2 may be arranged in the second direction DR2 and extend in the first direction DR1. The first wing plate WPT1 and the second wing plate WPT2 may have shapes that are symmetrical to each other in the second direction DR2.

Each of the first wing plate WPT1 and the second wing plate WPT2 may have a flat surface defined by the first and second directions DR1 and DR2. The first wing plate WPT1 may be disposed adjacent to the hinge module HGM and connected to the first body BD1. The second wing plate WPT2 may be disposed adjacent to the hinge module HGM and connected to the second body BD2.

Figure 9:
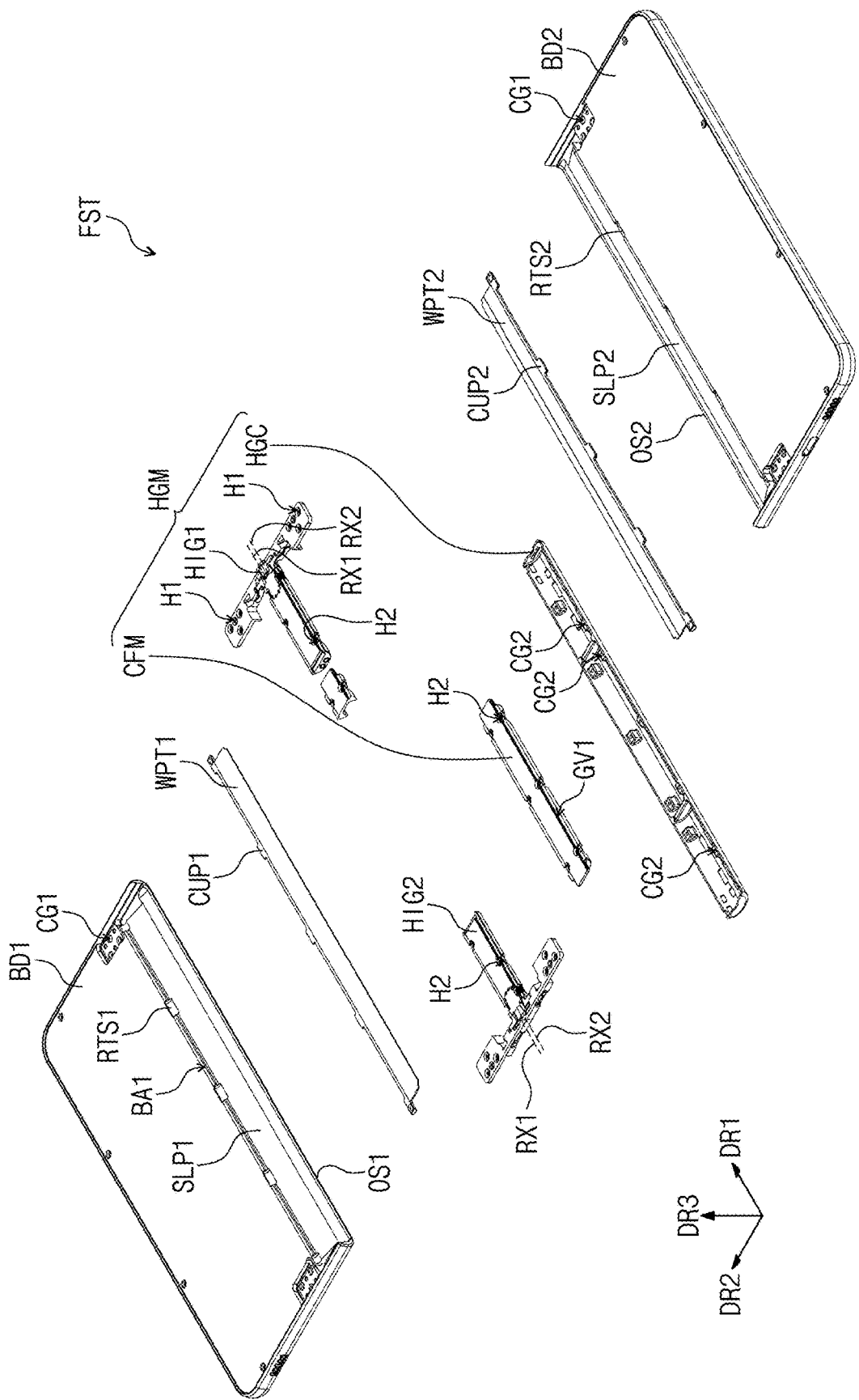
FIG. 9 is an exploded perspective view illustrating the folding set in FIG. 8.

FIG. 9 is an exploded perspective view illustrating the folding set in FIG. 8.

Referring to FIG. 9, a top surface of the first body BD1, which is adjacent to a first side OS1 of the first body BD1, may have a first inclined surface SLP1. The first inclined surface SLP1 may have a height that gradually decreases in a direction toward the first side OS1 of the first body BD1. The first inclined surface SLP1 may be stepped with a top surface of the first body BD1 around the first inclined surface SLP1.

A top surface of the second body BD2, which is adjacent to a first side OS2 of the second body BD2, may have a second inclined surface SLP2. The first side OS2 of the second body BD2 may face the first side OS1 of the first body BD1. The second inclined surface SLP2 may have a height that gradually decreases in a direction toward the first side OS2 of the second body BD2. The second inclined surface SLP2 may be stepped with a top surface of the second body BD2 around the second inclined surface SLP2.

The first wing plate WPT1 may be disposed on the first body BD1 and coupled to the first body BD1. The first wing plate WPT1 may be disposed on the first inclined surface SLP1. The first wing plate WPT1 may be rotatably coupled to a portion of the first body BD1, which is adjacent to the first side OS1 of the first body BD1. In an embodiment, the first wing plate WPT1 may be rotatably coupled to an upper side of the first inclined surface SLP1, which is farthest from the first side OS1 of the first body BD1, for example.

A plurality of first rotation surfaces RTS1 may be defined at the upper side of the first inclined surface SLP1. The upper side of the first inclined surface SLP1 may be defined as a first boundary BA1 between the first inclined surface SLP1 and the top surface of the first body BD1 around the first inclined surface SLP1. Each of the of first rotation surfaces RTS1 may have a recessed shape and be defined in the first body BD1. The first rotation surfaces RTS1 may be arranged in the first direction DR1 along the upper side of the first inclined surface SLP1.

The first wing plate WPT1 may include a plurality of first coupling parts CUP1 protruding from the second side of the first wing plate WPT1, which is opposite to the first side, which faces the second wing plate WPT2, of the first wing plate WPT1. The first coupling parts CUP1 may be arranged in the first direction DR1. The first coupling parts CUP1 may be disposed on the first rotation surfaces RTS1, respectively.

The first wing plate WPT1 may rotate with respect to a wing rotation axis that is adjacent to the second side of the first wing plate WPT1 and parallel to the first direction DR1. In an embodiment, the first coupling parts CUP1 may be coupled to the first rotation surfaces RTS1 and rotate with respect to the wing rotation axis, for example. The wing rotation axis will be illustrated in FIGS. 23 and 24 below.

The second wing plate WPT2 may be disposed on the second body BD2 and coupled to the second body BD2. The second wing plate WPT2 may be disposed on the second inclined surface SLP2. The second wing plate WPT2 may be rotatably coupled to a portion of the second body BD2, which is adjacent to the first side OS2 of the second body BD2. In an embodiment, the second wing plate WPT2 may be rotatably coupled to an upper side of the second inclined surface SLP2, which is farthest from the first side OS2 of the second body BD2, for example.

A plurality of second rotation surfaces RTS2 may be defined at the upper side of the second inclined surface SLP2. The upper side of the second inclined surface SLP2 may be defined as a second boundary BA2 between the second inclined surface SLP2 and the top surface of the second body BD2 around the second inclined surface SLP2. Each of the of second rotation surfaces RTS2 may have a recessed shape and be defined in the second body BD2. The second rotation surfaces RTS2 may be arranged in the first direction DR1 along the upper side of the second inclined surface SLP2.

The second wing plate WPT2 may include a plurality of second coupling parts CUP2 protruding from the second side of the second wing plate WPT2, which is opposite to the first side, which faces the first wing plate WPT1, of the second wing plate WPT2. The second coupling parts CUP2 may be arranged in the first direction DR1. The second coupling parts CUP2 may be disposed on the second rotation surfaces RTS2, respectively.

The second wing plate WPT2 may rotate with respect to a wing rotation axis that is adjacent to the second side of the second wing plate WPT2 and parallel to the first direction DR1. In an embodiment, the second coupling parts CUP2 may be coupled to the second rotation surfaces RTS2 and rotate with respect to the wing rotation axis, for example.

A hinge module HGM may include a first hinge HIG1, a second hinge HIG2, a central frame CFM, and a hinge cover HGC. The first hinge HIG1 and the second hinge HIG2 may be arranged in the first direction DR1. The first hinge HIG1 and the second hinge HIG2 may have shapes symmetrical to each other in the first direction DR1. The first hinge HIG1 and the second hinge HIG2 may be connected to the first and second bodies BD1 and BD2 and provide first and second rotation axes RX1 and RX2 to the first and second bodies BD1 and BD2.

The first hinge HIG1 may be disposed between the first body BD1 and the second body BD2. The first hinge HIG1 may be connected to the first sides of the first and second bodies BD1 and BD2 among both first and second sides, which are opposite to each other in the first direction DR1, of the first and second bodies BD1 and BD2.

The second hinge HIG2 may be disposed between the first body BD1 and the second body BD2. The second hinge HIG2 may be connected to second sides of the first and second bodies BD1 and BD2 among the both first and second sides, which are opposite to each other in the first direction DR1, of the first and second bodies BD1 and BD2.

A plurality of first holes H1 may be defined in each of the first hinge HIG1 and the second hinge HIG2. A plurality of first fastening grooves CG1 may be defined in each of the first hinge HIG1 and the second hinge HIG2. As a plurality of screws (not shown) passes through the first holes H1 and is inserted to the first fastening grooves CG1, the first and second hinges HIG1 and HIG2 may be connected to the first and second bodies BD1 and BD2.

The central frame CFM may extend in the first direction DR1 and be disposed between the first hinge HIG1 and the second hinge HIG2. The central frame CFM may be disposed between the first body BD1 and the second body BD2. The central frame CFM may be disposed between the first wing plate WPT1 and the second wing plate WPT2.

The hinge cover HGC may be disposed below the first hinge HIG1, the second hinge HIG2, and the central frame CFM. The first hinge HIG1, the second hinge HIG2, and the central frame CFM may be connected to the hinge cover HGC.

In an embodiment, a plurality of second holes H2 may be defined in each of the first hinge HIG1, the second hinge HIG2, and the central frame CFM, for example. A plurality of second fastening grooves CG2 may be defined in the hinge cover HGC. As a plurality of screws (not shown) passes through the second holes H2 and is inserted to the second fastening grooves CG2, the first hinge HIG1, the second hinge HIG2, and the central frame CFM may be connected to the hinge cover HGC.

First grooves GV1 may be defined in upper portions of both sides, which are opposite to each other in the second direction DR2, of the central frame CFM. Each of the first grooves GV1 may extend in the first direction DR1. When the hinge module HGM is connected to the first and second bodies BD1 and BD2, the first side of the first wing plate WPT1 and the first side of the second wing plate WPT2 may be disposed in the first grooves GV1, respectively.

Figure 10:
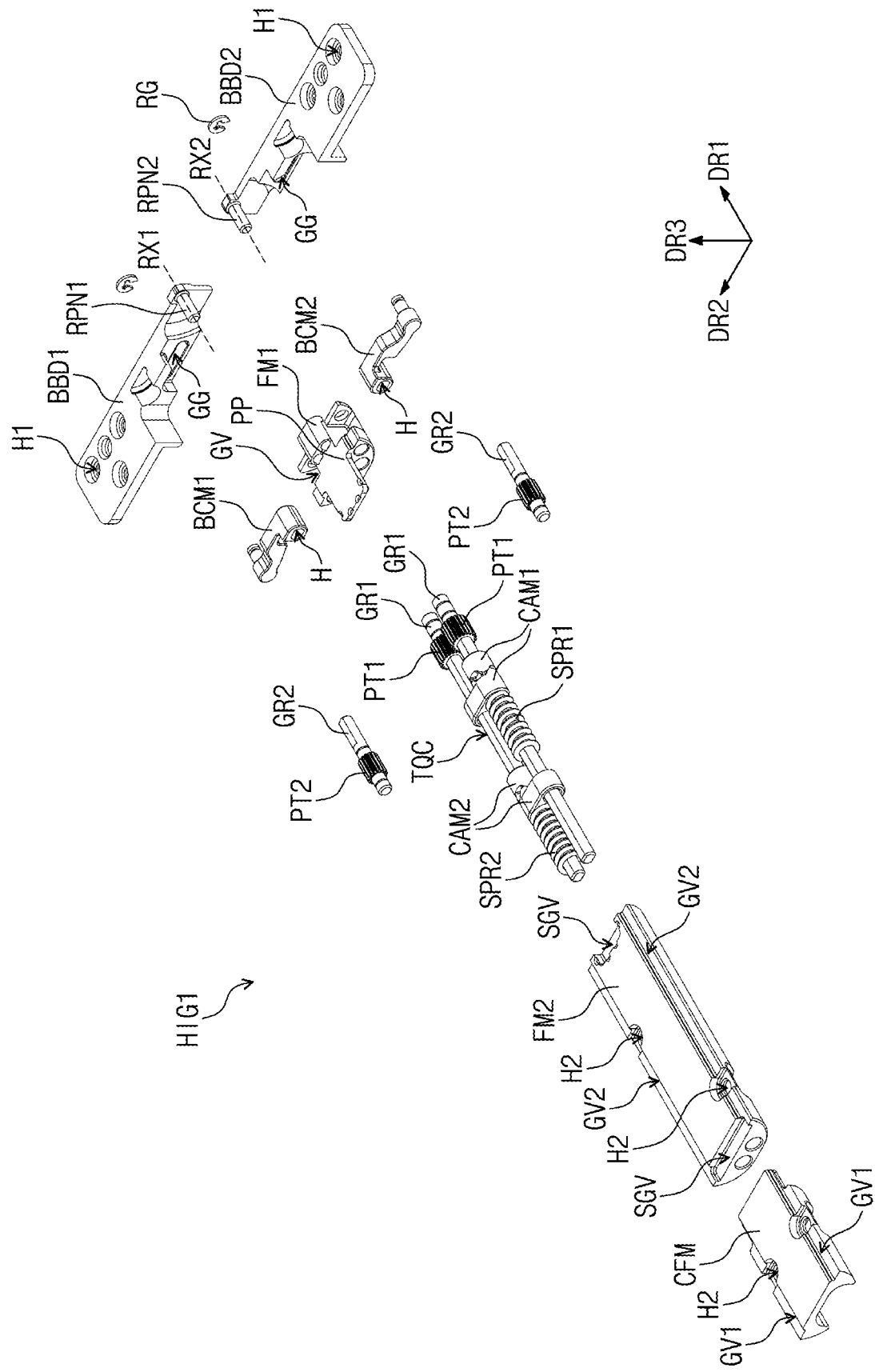
FIG. 10 is an exploded perspective view illustrating a first hinge in FIG. 9.
Figure 11:
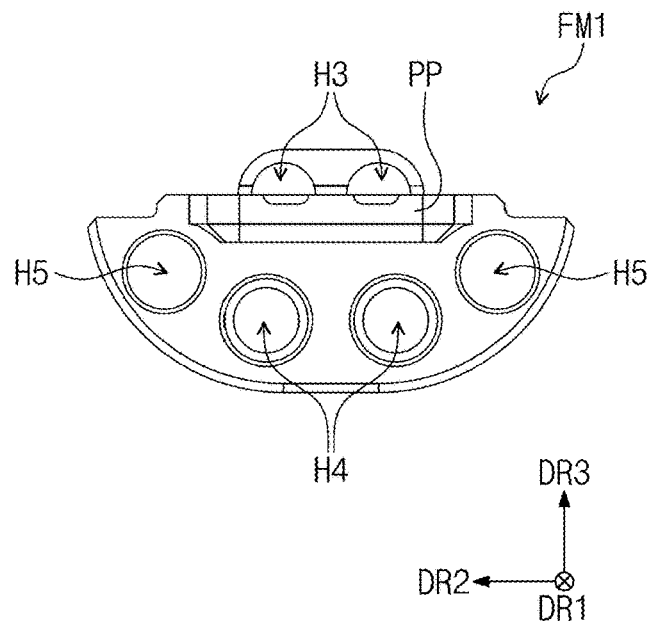
FIG. 11 is a front view illustrating a first frame in FIG. 10 when the first frame is viewed in the first direction.
Figure 12:
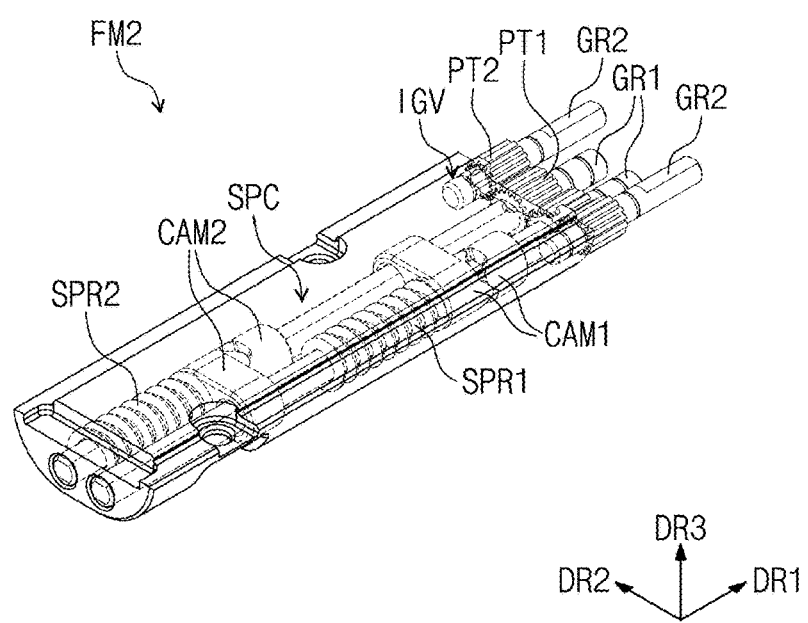
FIG. 12 is an internal transparent perspective view illustrating a second frame in FIG. 10.

FIG. 10 is an exploded perspective view illustrating the first hinge in FIG. 9. FIG. 11 is a front view illustrating a first frame in FIG. 10 when the first frame is viewed in the first direction. FIG. 12 is an internal transparent perspective view illustrating a second frame in FIG. 10.

Hereinafter, since the second hinge HIG2 have the same constitution as the first hinge HIG1, the constitution of the first hinge HIG1 will be described in detail, and the constitution of the second hinge HIG2 will be omitted. Hereinafter, FIG. 9 will be described together as necessary.

Referring to FIGS. 9 and 10, the first hinge HIG1 may include a plurality of bracket bodies BBD1 and BBD2, a plurality of rotation pin units RPN1 and RPN2, a plurality of bracket cams BCM1 and BCM2, a first frame FM1, a plurality of gears GR1 and GR2, a plurality of cams CAM1 and CMA2, a plurality of springs SPR1 and SPR2, a second frame FM2, and a plurality of ring units RG. Gears GR1 of the gears GR1 and GR2, the cams CAM1 and CAM2, and the springs SPR1 and SPR2 may be defined as a torque control part TQC.

The bracket bodies BBD1 and BBD2 may be connected to the first and second bodies BD1 and BD2 and the rotation pin units RPN1 and RPN2. The rotation pin units RPN1 and RPN2 may be connected to the first and second bodies BD1 and BD2 through the bracket bodies BBD1 and BBD2.

The bracket bodies BBD1 and BBD2 may include a first bracket body BBD1 connected to the first body BD1 and a second bracket body BBD2 connected to the second body BD2. The first bracket body BBD1 and the second bracket body BBD2 may be arranged in the second direction DR2 and have shapes that are symmetrical to each other in the second direction DR2. The first holes H1 may be defined in each of the first and second bracket bodies BBD1 and BBD2.

The rotation pin units RPN1 and RPN2 may include a first rotation pin unit RPN1 connected to the first bracket body BBD1 and a second rotation pin unit RPN2 connected to the second bracket body BBD2. The first rotation pin unit RPN1 and the second rotation pin unit RPN2 may be spaced apart from each other in the second direction DR2 and each extend in the first direction DR1. The first rotation pin unit RPN1 and the second rotation pin unit RPN2 may define a first rotation axis RX1 and a second rotation axis RX2, respectively.

The first rotation pin unit RPN1 and the second rotation pin unit RPN2 may be connected to a first side of the first bracket body BBD1 and a first side of the second bracket body BBD2, which face each other in the second direction DR2, respectively. The first and second rotation pin units RPN1 and RPN2 may be separately manufactured and connected to the first and second bracket bodies BBD1 and BBD2, respectively. However, the invention is not limited thereto. In an embodiment, the first and second rotation pin units RPN1 and RPN2 may be integrated with the first and second bracket bodies BBD1 and BBD2 and extend from the first and second bracket bodies BBD1 and BBD2, respectively, for example.

The first frame FM1, the second frame FM2, and the central frame CFM may be arranged in the first direction DR1. The second frame FM2 may be disposed between the first frame FM1 and the central frame CFM. The first frame FM1 may be disposed between the first and second bracket bodies BBD1 and BBD2 and the second frame FM2.

Referring to FIGS. 10 and 11, the first and second rotation pin units RPN1 and RPN2 may be inserted to the first frame FM1 and coupled to the first frame FM1. In an embodiment, third holes H3 each extending in the first direction DR1 may be defined in a portion of the first frame FM1, which is adjacent to an upper side of the first frame FM1, for example. The first and second rotation pin units RPN1 and RPN2 may be inserted to the third holes H3, respectively, and coupled to the first frame FM1.

Each of the gears GR1 and GR2 may extend in the first direction DR1. The gears GR1 and GR2 may include a plurality of first gears GR1 and a plurality of second gears GR2. Although two first gears GR1 and two second gears GR2 are illustrated, the invention is not limited to the number of each of the first and second gears GR1 and GR2. The first gears GR1 may each extend in the first direction DR1 and be engaged with each other to rotate in the second direction DR2.

The second gears GR2 may each extend in the first direction DR1 and be spaced apart from each other in the second direction DR2. The first gears GR1 may be disposed between the second gears GR2. The second gears GR2 may be engaged with the first gears GR1 to rotate in the second direction DR2. The first and second gears GR1 and GR2 may rotate with respect to gear rotation shafts (not shown) parallel to the first direction DR1.

The first gears GR1 may include a plurality of first protruding parts PT1 disposed on outer circumferential surfaces of the first gears GR1, which are adjacent to first sides of the first gears GR1 among both first and second sides, which are opposite to each other in the first direction DR1, of the first gears GR1, to define shapes of the gears. As the first protruding parts PT1 of the first gears GR1 move while being engaged with each other, the first gears GR1 may rotate together.

First sides of the second gears GR2, which are opposite to each other in the first direction DR1 among both first and second sides of the second gears GR2, may be adjacent to the first sides of the first gears GR1. The second gears GR2 may include a plurality of second protruding parts PT2 disposed on outer circumferential surfaces of the second gears GR2, which are adjacent to the second sides of the second gears GR2 among both sides of the second gears GR2 to define shapes of the gears. As the second protruding parts PT2 move while engaged with the first protruding parts PT1, the second gears GR2 may rotate in conjunction with the first gears GR1.

As the first gears GR1 are inserted to the cams CAM1 and CAM2 and the springs SPR1 and SPR2, the cams CAM1 and CAM2 and the springs SPR1 and SPR2 may be disposed on the first gears GR1. The second sides of the first gears GR1 may be inserted to the cams CAM1 and CAM2 and the springs SPR1 and SPR2. The cams CAM1 and CAM2 and the springs SPR1 and SPR2 may be disposed between the first protruding parts PT1 and the second sides of the first gears GR1.

The first and second gears GR1 and GR2 may have first sides facing the first frame FM1 and the second sides facing the second frame FM2. The first and second gears GR1 and GR2 may have first sides inserted to the first frame FM1 and the second sides inserted to the second frame FM2.

A plurality of fourth and fifth holes H4 and H5 each extending in the first direction DR1 may be defined in a portion of the first frame FM1, which is adjacent to a lower side of the first frame FM1. The fourth and fifth holes H4 and H5 may be defined below the third holes H3. The fourth holes H4 may be defined in correspondence to the first gears GR1. The fifth holes H5 may be defined in correspondence to the second gears GR2.

The first gears GR1 may be coupled to the first frame FM1 as the first sides of the first gears GR1 are inserted to the fourth holes H4, respectively. The second gears GR2 may be coupled to the first frame FM1 as the first sides of the second gears GR2 are inserted to the fifth holes H5, respectively.

A portion of the first frame FM1 between the third holes H3 and the fourth holes H4 may be defined as a flat portion PP and have a flat plate shape defined by the first and second directions DR1 and DR2.

Seated grooves SGV may be defined in upper portions of both sides, which face each other in the first direction DR1, of the second frame FM2. An end of the flat portion PP may be disposed in the seated groove SGV of the second frame FM2, which faces the first frame FM1. An upper portion of a first side of the central frame CFM may be disposed in the seated groove SGV of the second frame FM2, which faces the central frame CFM.

Referring to FIGS. 10 and 12, an inner space SPC and a plurality of insertion grooves IGV may be defined in the second frame FM2. The inner space SPC may be defined in correspondence to the first gears GR1. The insertion grooves IGV may be defined in correspondence to the second gears GR2. The second sides of the first gears GR1 may be inserted to the inner space SPC. The second sides of the second gears GR2 may be inserted to the insertion grooves IGV, respectively.

Two holes (no reference numerals) may be defined at an end of the inner space SPC, and the second sides of the first gears GR1 may be disposed in the two holes, respectively. The first and second cams CAM1 and CAM2 and the first and second springs SPR1 and SPR2 may be disposed in the inner space SPC so as to be disposed in the second frame FM2.

Referring to FIG. 10, the bracket cams BCM1 and BCM2 may include a first bracket cam BCM1 coupled to the first bracket body BBD1 and a second bracket cam BCM2 coupled to the second bracket body BBD2. The first bracket cam BCM1 and the second bracket cam BCM2 may be arranged in the second direction DR2 and have shapes symmetrical to each other in the second direction DR2.

Grooves GV may be defined at both sides of the first frame FM1, which are opposite to each other in the second direction DR2. The first and second bracket cams BCM1 and BCM2 may be disposed in the grooves GV. First sides of the first and second bracket cams BCM1 and BCM2, which face each other in the second direction DR2, may be disposed in the grooves GV.

The first sides of the second gears GR2 may be inserted to the first sides of the first and second bracket cams BCM1 and BCM2. Thus, the first sides of the first and second bracket cams BCM1 and BCM2 may be coupled to the second gears GR2. The first and second bracket cams BCM1 and BCM2 may be coupled to the second gears GR2 as the first sides of the second gears GR2 are inserted to holes H defined at the first sides of the first and second bracket cams BCM1 and BCM2.

The second sides of the first and second bracket cams BCM1 and BCM2 may protrude in the first direction DR1 and be disposed in guide grooves GG defined in the first and second bracket bodies BBD1 and BBD2. Ring units RG may be disposed at the second sides of the first and second bracket cams BCM1 and BCM2, which protrude in the first direction DR1.

The guide grooves GG may be defined in first surfaces of the first and second bracket bodies BBD1 and BBD2, which face the first and second bracket cams BCM1 and BCM2. The guide groove GG may each extend in the second direction DR2.

When the first and second rotation pin units RPN1 and RPN2, the first and second bracket cams BCM1 and BCM2 may rotate in conjunction with the second gears GR2 to move along the guide grooves GG. This operation will be described below in detail.

Second grooves GV2 may be defined in upper portions of both sides of the second frame FM2, which are opposite to each other in the second direction DR2. The second grooves GV2 may each extend in the first direction DR1. When the hinge module HGM is connected to the first and second bodies BD1 and BD2, the first side of the first wing plate WPT1 and the first side of the second wing plate WPT2, which face each other, may be disposed in the second grooves GV2.

Figure 13:
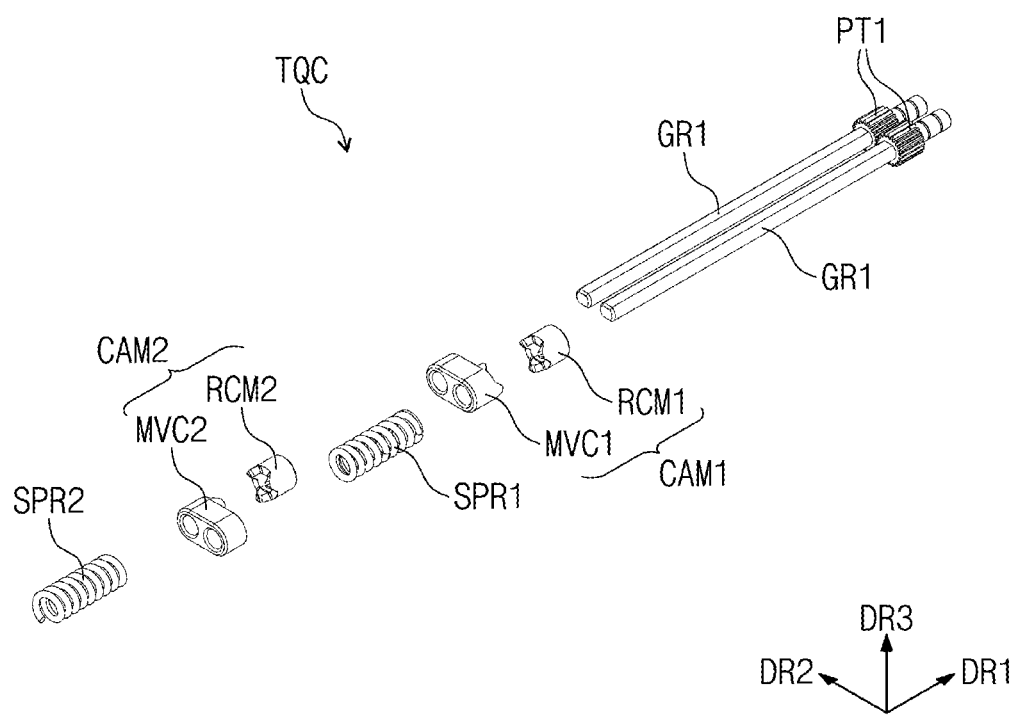
FIG. 13 is an exploded perspective view illustrating a torque control part in FIG. 10.

FIG. 13 is an exploded perspective view illustrating the torque control part in FIG. 10.

Hereinafter, FIG. 10 will be described together as necessary.

Referring to FIGS. 10 and 13, the torque control part TQC may include a plurality of first gears GR1, a plurality of cams CAM1 and CAM2, and a plurality of springs SPR1 and SPR2. The cams CAM1 and CAM2 may include a first cam CAM1 and a second cam CAM2, which are spaced apart from each other in the first direction DR1.

The first cam CAM1 may include a first moving cam MVC1 and a first rotating cam RCM1. The second cam CAM2 may include a second moving cam MVC2 and a second rotating cam RCM2. The springs SPR1 and SPR2 may include a first spring SPR1 and a second spring SPR2, each of which extends in the first direction DR1.

The first gears GR1 may be inserted to the first and second moving cams MVC1 and MVC2. The first gears GR1 may be inserted to each of the first and second moving cams MVC1 and MVC2 in common. The first gears GR1 may be inserted to holes (no reference numerals) passing through each of the first and second moving cams MVC1 and MVC2 in the first direction DR1. As the first sides of the first gears GR1 pass through the holes defined in the first and second moving cams MVC1 and MVC2, the first and second moving cams MVC1 and MVC2 may be disposed on outer circumferential surfaces of portions of the first gears GR1.

The first gears GR1 may be inserted to the first and second rotating cams RCM1 and RCM2. The first gears GR1 may be inserted to the first and second rotating cams RCM1 and RCM2, respectively, so that the first gears GR1 one-to-one correspond to the first and second rotating cams RCM1 and RCM2.

The corresponding first gear GR1 of the first gears GR1 may be inserted to a hole (no reference numerals) passing through each of the first and second rotating cams RCM1 and RCM2 in the first direction DR1. As the first sides of the first gears GR1 pass through the holes defined in the first and second rotating cams RCM1 and RCM2, the first and second rotating cams RCM1 and RCM2 may be disposed on outer circumferential surfaces of portions of the first gears GR1.

The first gears GR1 may be inserted to the first and second springs SPR1 and SPR2. The first gears GR1 may be inserted to the first and second springs SPR1 and SPR2, respectively, so that the first gears GR1 one-to-one correspond to the first and second springs SPR1 and SPR2.

Each of the first and second moving cams MVC1 and MVC2 may be disposed between corresponding one pair of the rotating cam and the spring among the first and second rotating cams RCM1 and RCM2 and the first and second springs SPR1 and SPR2. The corresponding one pair of the rotating cam and the spring may be disposed on the same first gear GR1. Thus, each of the first and second moving cams MVC1 and MVC2 may be disposed between one pair of the rotating cam and the spring disposed on the corresponding first gear GR1 of the first gears GR1.

The first moving cam MVC1 may be disposed between the first rotating cam RCM1 and the first spring SPR1, which are disposed on one first gear GR1. The second moving cam MVC2 may be disposed between the second rotating cam RCM2 and the second spring SPR2, which are disposed on another first gear GR1.

One surface of the moving cam and one surface of the rotating cam, which are disposed on the same first gear GR1 and face each other, may include protruding portions. The protruding portions of the one surface of the moving cam and the protruding portions of the one surface of the rotating cam, which are disposed on the same first gear GR1, may be alternately disposed to each other.

In an embodiment, one surface of the first moving cam MVC1 and one surface of the first rotating cam RCM1, which are disposed on one first gear GR1 and face each other, may include protruding portions (no reference numerals), for example. The protruding portions of the one surface of the first moving cam MVC1 and the protruding portions of the one surface of the first rotating cam RCM1 may be alternately disposed to each other.

One surface of the second moving cam MVC2 and one surface of the second rotating cam RCM2, which are disposed on another first gear GR1 and face each other, may include protruding portions (no reference numerals). The protruding portions of the one surface of the second moving cam MVC2 and the protruding portions of the one surface of the second rotating cam RCM2 may be alternately disposed to each other.

Figure 14:
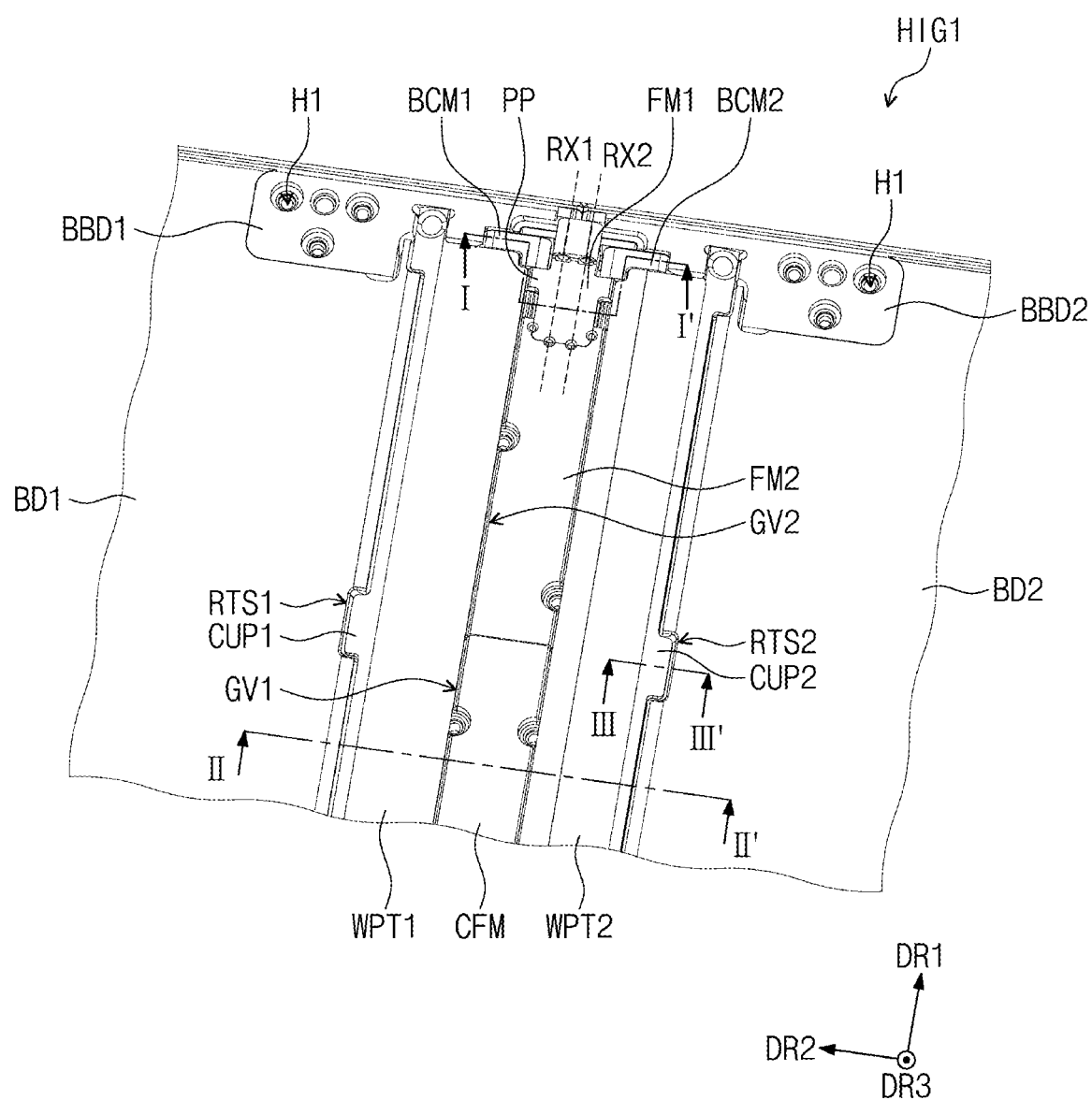
FIG. 14 is a view illustrating a state in which the first hinge in FIGS. 9 and 10 is coupled to first and second bodies.
Figure 15:
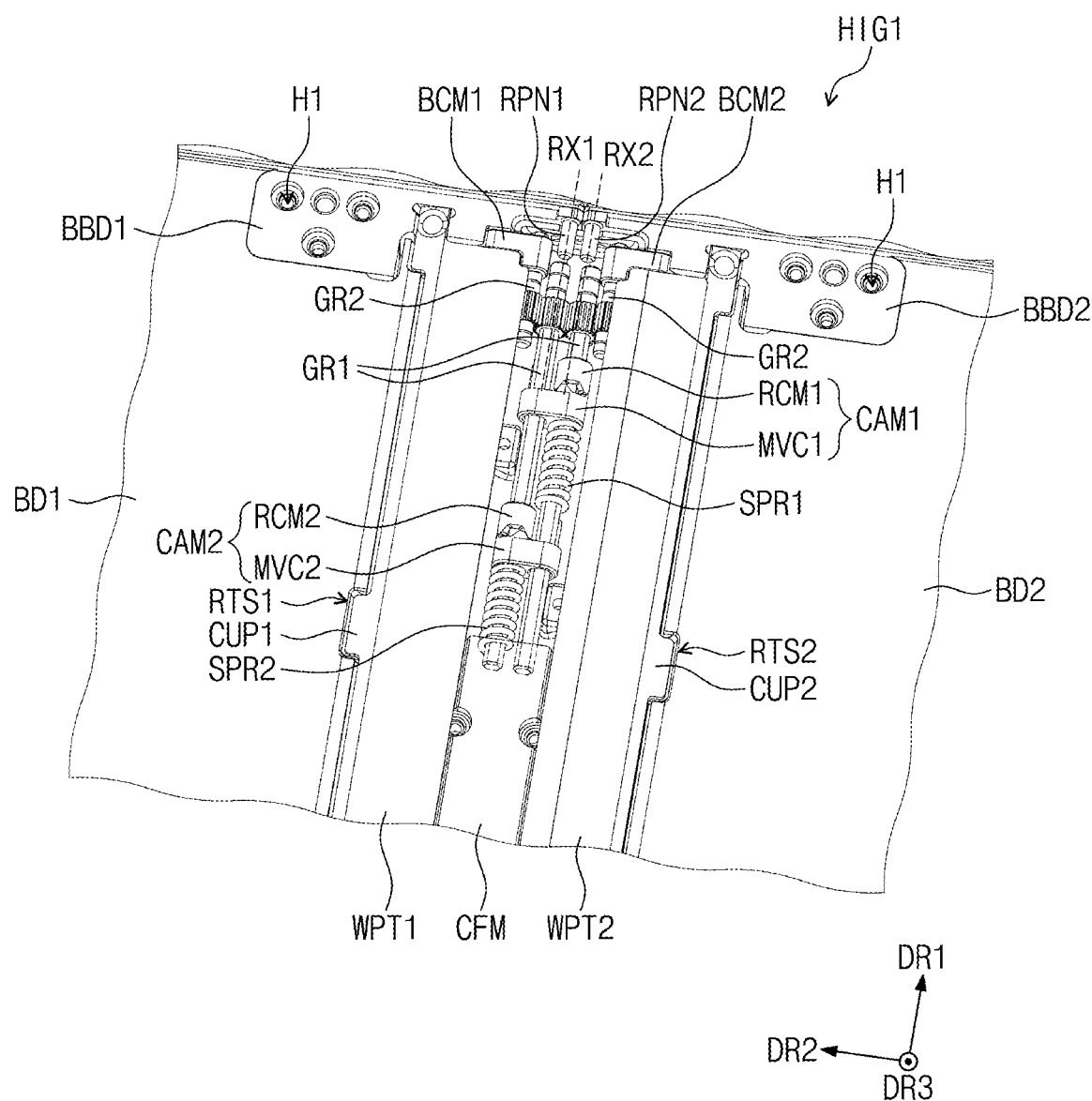
FIG. 15 is a view illustrating components disposed in first and second frames in FIG. 14.

FIG. 14 is a view illustrating a state in which the first hinge in FIGS. 9 and 10 is coupled to the first and second bodies. FIG. 15 is a view illustrating components disposed in the first and second frames in FIG. 14.

In FIG. 15, the first and second frames FM1 and FM2 are omitted. Hereinafter, FIG. 10 will be described together as necessary.

Referring to FIGS. 10, 14, and 15, the first and second bracket bodies BBD1 and BBD2 may be connected to the first and second bodies BD1 and BD2 through screws inserted to the first holes H1.

The first and second rotation pin units RPN1 and RPN2 may be inserted to the first frame FM1 and rotatably coupled to the first frame FM1. The first rotation pin unit RPN1 may define the first rotation axis RX1, and the second rotation pin unit RPN2 may define the second rotation axis RX2.

The first and second bracket cams BCM1 and BCM2 may be coupled to the first and second bracket bodies BBD1 and BBD2, respectively. As the first and second bracket cams BCM1 and BCM2 may be disposed on the first frame FM1, and the second gears GR2 are inserted to the first and second bracket cams BCM1 and BCM2, the first and second bracket cams BCM1 and BCM2 may be coupled to the first frame FM1. The first and second bracket cams BCM1 and BCM2 may be coupled to the second gears GR2 to rotate in conjunction with the second gears GR2.

An end of the flat part PP is disposed in the seated groove SGV defined at a first side of the second frame FM2, and the first and second frames FM1 and FM2 may be connected to each other by fastening units (not shown) such as screws.

The first and second gears GR1 and GR2 may be inserted and coupled to the first and second frames FM1 and FM2. The first and second protruding parts PT1 and PT2 may be engaged with each other and coupled to rotate each other.

The first and second moving cams MVC1 and MVC2, the first and second rotating cams RCM1 and RCM2, and the first and second springs SPR1 and SPR2 may be coupled to the first gears GR1 and disposed in the second frame FM2. The first and second rotating cams RCM1 and RCM2 may be coupled to the first gears GR1 to rotate in conjunction with the first gears GR1.

A first side of the first wing plate WPT1 and a first side of the second wing plate WPT2 may be disposed in the first grooves GV1 and the second grooves GV2. The first and second coupling parts CUP1 and CUP2 of the first and second wing plates WPT1 and WPT2 may be rotatably coupled to the first and second rotation surfaces RTS1 and RTS2 defined in the first and second bodies BD1 and BD2.

Figure 16A:
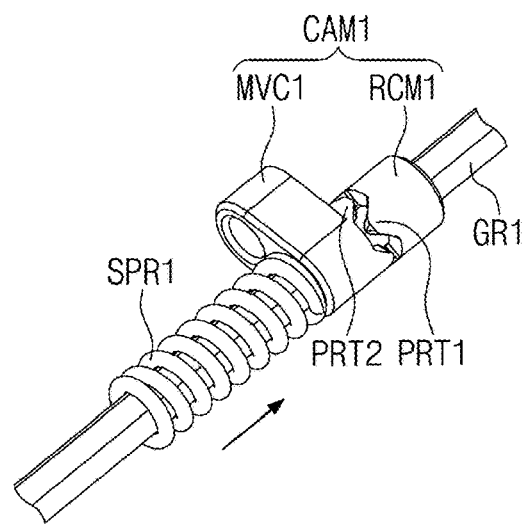
FIGS. 16A and 16B are views for explaining operations of a first rotating cam and a first moving cam in FIG. 15.
Figure 16B:
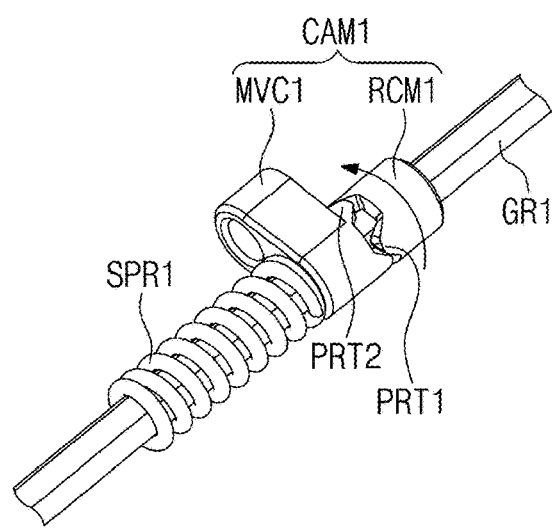

FIGS. 16A and 16B are views for explaining an operation of the first rotating cam and the first moving cam in FIG. 15.

Although an operation of the first rotating cam RCM1 and the first moving cam MVC1 will be described, an operation of the second rotating cam RCM2 and the second moving cam MVC2 may be the same as that of the first rotating cam RCM1 and the first moving cam MVC1.

Referring to FIG. 16A, first protruding portions PRT1 of the first rotating cam RCM1 may be disposed between second protruding portions PRT2 of the first moving cam MVC1. A state in which the first protruding portions PRT1 are disposed between the second protruding portions PRT2 may be maintained by an elastic force applied by the first spring SPR1. In an embodiment, in FIG. 16A, the display device may be in an unfolded state, for example. As the state in which the first protruding portions PRT1 are disposed between the second protruding portions PRT2 is maintained, the unfolded state of the display device DD may be further easily maintained.

Referring to FIG. 16B, the display device DD may be folded by an external force (e.g., a force of a user). When the first rotating cam RCM1 rotates by an external force, the first protruding portions PRT1 may move in a counterclockwise direction through protruding top surfaces of the second protruding portions PRT2. When the force of the user is greater than a force for maintaining the state in which the first protruding portions PRT1 are disposed between the second protruding portions PRT2, the first protruding portions PRT1 may move through the top surfaces of the second protruding portions PRT2, and the display device DD may be folded.

By the above-described operation, when the display device DD is unfolded, the unfolded state is easily maintained, and when the user is intended to fold the display device DD, the display device DD may be folded by applying a predetermined force to the display device DD. For the above-described operation, the torque control part TQC including the first and second cams CAM1 and CAM2 may be provided to the hinge module HGM.

Figure 17A:
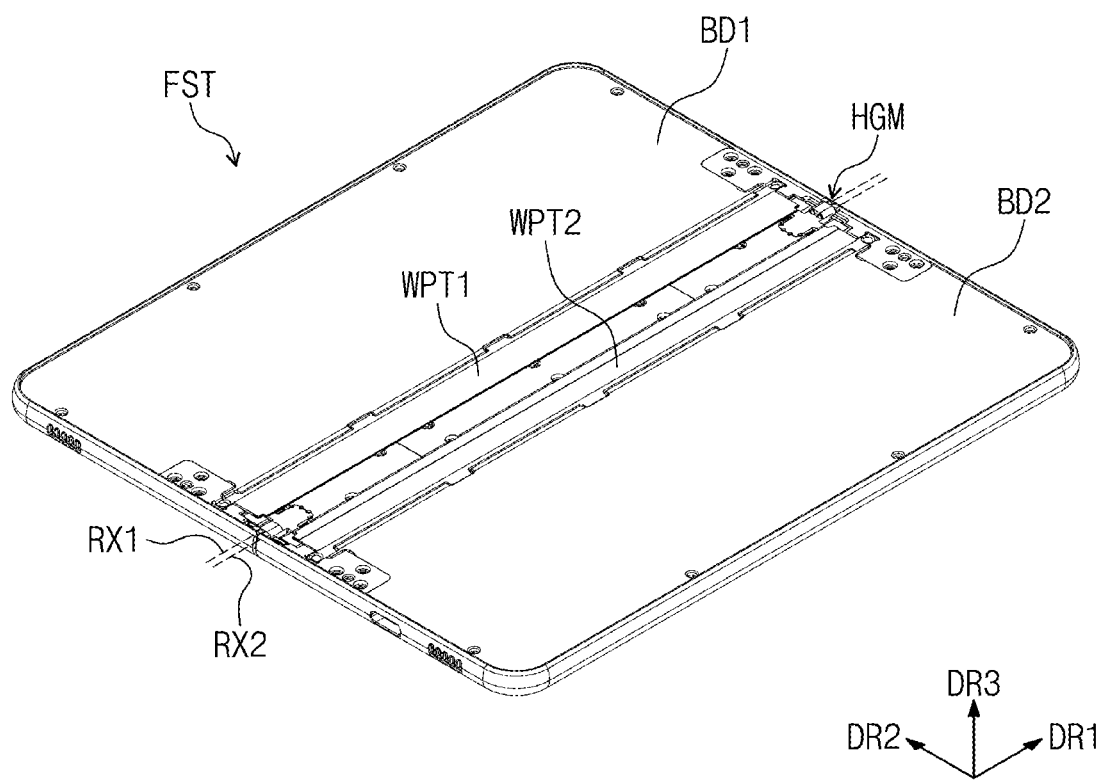
FIG. 17A is a view illustrating an unfolded state of the folding set in FIG. 8.
Figure 17B:
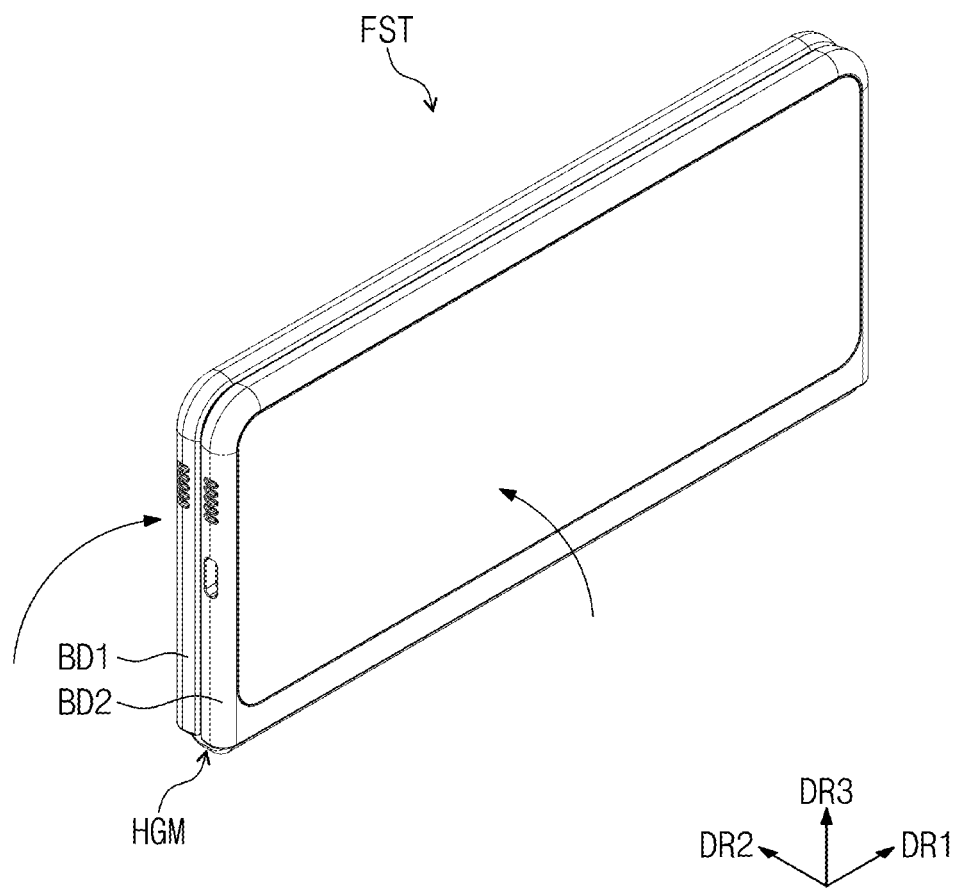
FIG. 17B is a view illustrating a folded state of the folding set in FIG. 17A.

FIG. 17A is a view illustrating an unfolded state of the folding set in FIG. 8. FIG. 17B is a view illustrating a folded state of the folding set in FIG. 17A.

Referring to FIGS. 17A and 17B, the folding set FST may be folded by rotating with respect to the first and second rotation axes RX1 and RX2 that are defined by the first and second rotation pin units RPN1 and RPN2, respectively. The display module DM disposed on the folding set FST may be folded as the folding set FST is folded.

Figure 18A:
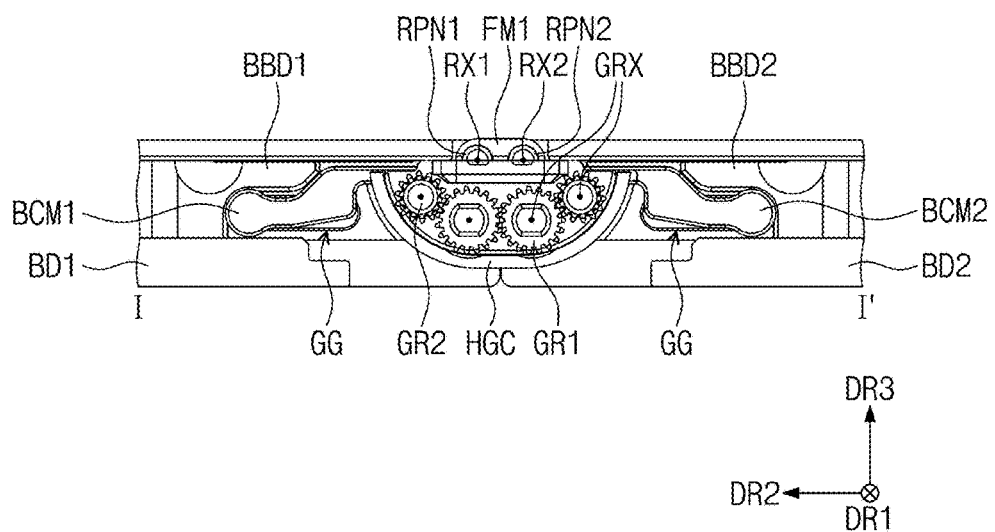
FIG. 18A is a cross-sectional view taken along line I-I' of FIG. 14.
Figure 18B:
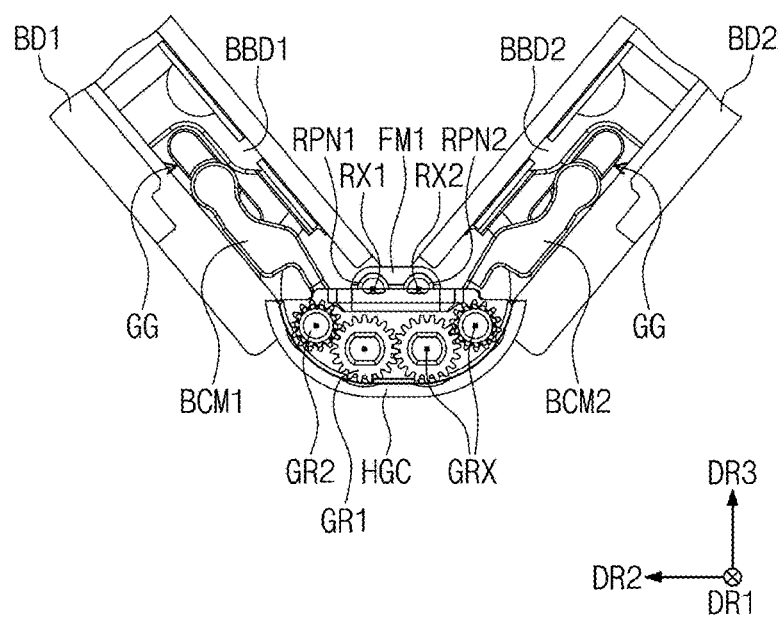
FIGS. 18B and 18C are views for explaining a folded state of the folding set in FIG. 18A.
Figure 18C:
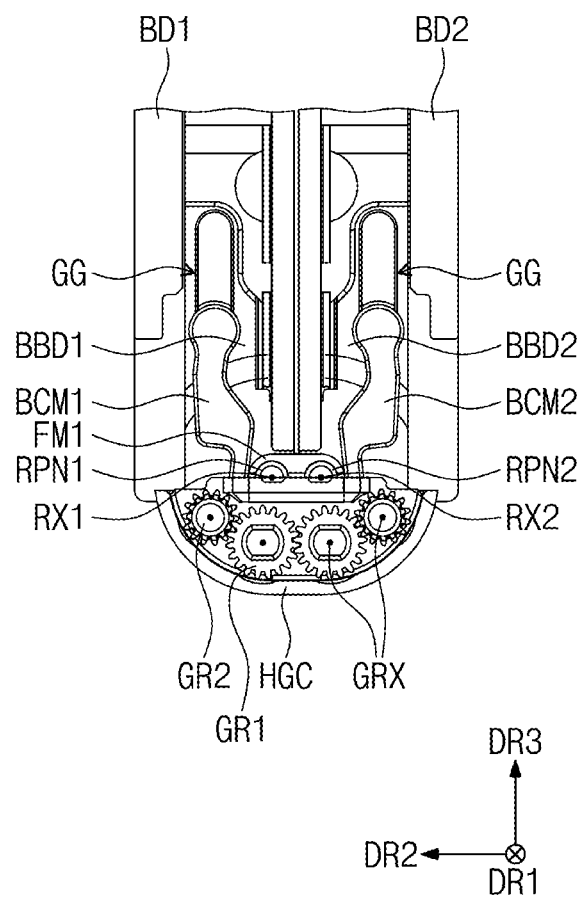

FIG. 18A is a cross-sectional view taken along line I-I' of FIG. 14. FIGS. 18B and 18C are views for explaining a folded state of the folding set in FIG. 18A.

Hereinafter, FIG. 14 will be described together as necessary.

Referring to FIGS. 14, 18A, 18B, and 18C, the folding set FST may be folded by rotating with respect to the first and second rotation axes RX1 and RX2 that are defined by the first and second rotation pin units RPN1 and RPN2, respectively. As the first and second rotation pin units RPN1 and RPN2 rotate, the first and second bracket bodies BBD1 and BBD2 may move by rotating with respect to the first and second rotation axes RX1 and RX2.

As the first and second bracket bodies BBD1 and BBD2 rotate, the first and second bodies BD1 and BD2 connected to the first and second bracket bodies BBD1 and BBD2 may move by rotating with respect to the first and second rotation axes RX1 and RX2. That is, the first and second rotation pin units RPN1 and RPN2 may provide the first and second rotation axes RX1 and RX2 to the first and second bodies BD1 and BD2, and the first and second bodies BD1 and BD2 may rotate with respect to the first and second rotation axes RX1 and RX2. As the first body BD1 and the second body BD2 are disposed to face each other, the folding set FST may be in-folded.

The first and second gears GR1 and GR2 may be disposed below the first and second rotation pin units RPN1 and RPN2. When the first and second rotation pin units RPN1 and RPN2 rotate, the first and second gears GR1 and GR2 may rotate in conjunction with the first and second rotation pin units RPN1 and RPN2.

Specifically, as the first and second bracket bodies BBD1 and BBD2 rotating in conjunction with the first and second rotation pin units RPN1 and RPN2 move, the first and second bracket cams BCM1 and BCM2 coupled to the first and second bracket bodies BBD1 and BBD2 may move. As the first and second bracket cams BCM1 and BCM2 move, the second gears GR2 coupled to the first and second bracket cams BCM1 and BCM2 may rotate.

As the second gears GR2 rotate, the first gears GR1 engaged with the second gears GR2 may rotate. That is, as the first and second bracket cams BCM1 and BCM2 rotate and move, the first and second gears GR1 and GR2 may rotate in conjunction with the first and second bracket cams BCM1 and BCM2. The first and second gears GR1 and GR2 may rotate with respect to gear rotation axes GRX, respectively, which are parallel to the first direction DR1 and defined in central portions of the first and second gears GR1 and GR2 in the first direction DR1.

When the first and second bracket cams BCM1 and BCM2 rotate, one ends of the first and second bracket cams BCM1 and BCM2 may move along the guide grooves GG defined in the first and second bracket bodies BBD1 and BBD2. When the folding set FST is folded, the first and second bracket cams BCM1 and BCM2 and the first and second bracket bodies BBD1 and BBD2 may move relatively away from each other. As the first and second bracket cams BCM1 and BCM2 move along the guide grooves GG, the first and second bracket bodies BBD1 and BBD2 may further easily move.

Figure 19A:
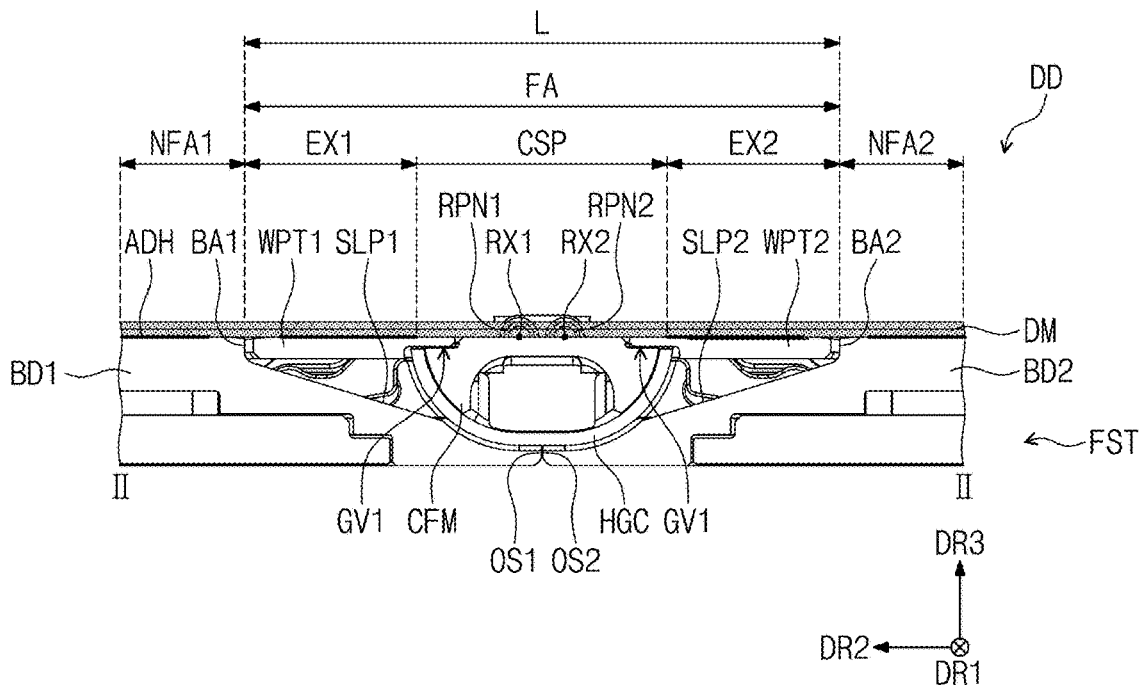
FIG. 19A is a cross-sectional view taken along line II-II' of FIG. 14.
Figure 19B:
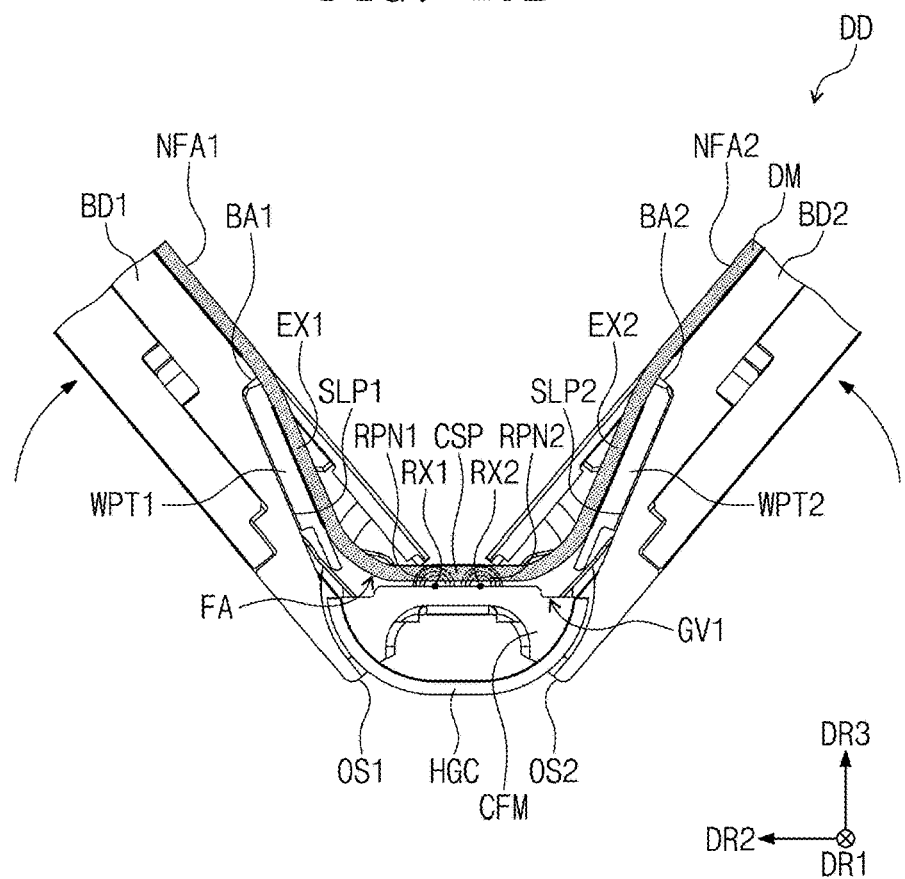
FIGS. 19B and 19C are views for explaining a folded state of the folding set in FIG. 19A.
Figure 19C:
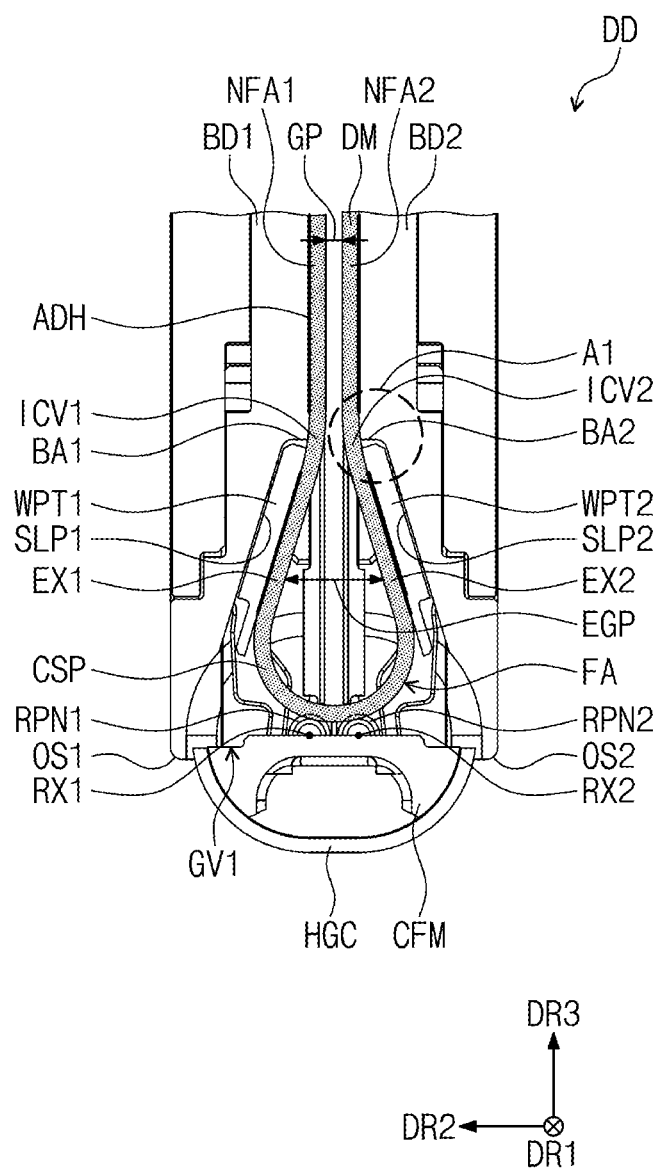

FIG. 19A is a cross-sectional view taken along line II-II' of FIG. 14. FIGS. 19B and 19C are views for explaining a folded state of the folding set in FIG. 19A.

In an embodiment, in FIGS. 19A, 19B, and 19C, the display module DM is illustrated together with the folding set FST to explain a folded state of the display module DM, for example.

Referring to FIG. 19A, the display module DM may be disposed on the folding set FST. The first body BD1 may be disposed below the first non-folding area NFA1, and the second body BD2 may be disposed below the second non-folding area NFA2. The first rotation axis RX1 and the second rotation axis RX2 may be disposed below a top surface of the display module DM.

In a plan view, the first and second rotation axes RX1 and RX2 may overlap the folding area FA. A length L of the folding area FA may be defined as a length in the second direction DR2 in an unfolded state of the display module DM.

The central frame CFM may be disposed below the folding area FA. Although not shown, the first and second frames FM1 and FM2, which are arranged with the central frame CFM in the first direction DR1, may be disposed below the folding area FA.

The first body BD1 may extend below the first extension part EX1 and the curved part CSP, and the second body BD2 may extend below the second extension part EX2 and the curved part CSP. The first body BD1 and the second body BD2 may be adjacent to each other in the second direction DR2 below the curved part CSP.

The top surface of the first body BD1, which faces the first extension part EX1, may be defined as the first inclined surface SLP1. The top surface of the first body BD1 below the first wing plate WPT1 may be provided as the first inclined surface SLP1.

The top surface of the second body BD2, which faces the second extension part EX2, may be defined as the second inclined surface SLP2. The top surface of the second body BD2 below the second wing plate WPT2 may be provided as the second inclined surface SLP2. Heights of the first and second inclined surfaces SLP1 and SLP2 may decrease in a direction toward the first sides OS1 and OS2 of the first and second bodies BD1 and BD2.

The first inclined surface SLP1 and the second inclined surface SLP2 may be stepped with the top surfaces of the first and second bodies BD1 and BD2 disposed below the first and second non-folding areas NFA1 and NFA2. A boundary between the first inclined surfaces SLP1 and the first body BD1 disposed below the first non-folding areas NFA1 may be defined as the first boundary BA1. A boundary between the second inclined surfaces SLP2 and the second body BD2 disposed below the second non-folding areas NFA2 may be defined as the second boundary BA2.

The first wing plate WPT1 may be disposed between the first extension part EX1 and the first inclined surface SLP1. The first wing plate WPT1 may be adjacent to the first boundary BA1. The second wing plate WPT2 may be disposed between the second extension part EX2 and the second inclined surface SLP2. The second wing plate WPT2 may be adjacent to the second boundary BA2.

A first side of the first wing plate WPT1 and a first side of the second wing plate WPT2, which face each other, may be disposed on both sides of the central frame CFM. Specifically, the first side of the first wing plate WPT1 and the first side of the second wing plate WPT2, which face each other, may be disposed in the first grooves GV1 defined at the both sides of the central frame CFM. Although not shown in FIG. 19A, the first side of the first wing plate WPT1 and the first side of the second wing plate WPT2 may be disposed in the second grooves GV2 defined in the second frame FM2.

The display device DD may further include an adhesive layer ADH. The adhesive layer ADH may be disposed between the first non-folding area NFA1 and the first body BD1 and between the second non-folding area NFA2 and the second body BD2. Also, the adhesive layer ADH may be disposed between the first extension part EX1 and the first wing plate WPT1 and disposed between the second extension part EX2 and the second wing plate WPT2.

The display module DM may be attached to the first and second bodies BD1 and BD2 and the first and second wing plates WPT1 and WPT2 by the adhesive layer ADH. Although the adhesive layer ADH may be a double sided tape as an example, the invention is not limited to the kind of the adhesive layer ADH.

Referring to FIGS. 19B and 19C, as the folding set FST is folded with respect to the first and second rotation axes RX1 and RX2, the display module DM may be folded. As the folding area FA is bent, the display module DM may be folded. The display module DM may be in-folded so that the first non-folding area NFA1 and the second non-folding area NFA2 face each other.

When the display module DM is folded, the curved part CSP may be bent to have a predetermined curvature. That is, the curved part CSP may be bent to have a predetermined radius of curvature. In an embodiment, the radius of curvature may be set in a range from about 1.5 millimeters (mm) to about 5.0 mm, and more preferably set to about 2.5 mm, for example.

A portion of the display module DM between the first extension part EX1 and the first non-folding area NFA1 may be bent. The first extension part EX1 may be bent from the first non-folding area NFA1 and extend to the curved part CSP. The first extension part EX1 attached to the flat first wing plate WPT1 may maintain a flat state.

A portion of the display module DM between the second extension part EX2 and the second non-folding area NFA2 may be bent. The second extension part EX2 may be bent from the second non-folding area NFA2 and extend to the curved part CSP. The second extension part EX2 attached to the flat second wing plate WPT2 may maintain a flat state.

The bent portion of the display module DM between the first extension part EX1 and the first non-folding area NFA1 may be defined as a first reverse curvature part ICV1. The bent portion of the display module DM between the second extension part EX2 and the second non-folding area NFA2 may be defined as a second reverse curvature part ICV2. When the display module DM is folded, the first reverse curvature part ICV1 and the second reverse curvature part ICV2 may be bent in a direction opposite to the curved part CSP.

The adhesive layer ADH may not be disposed on a bottom surface of the curved part CSP and bottom surfaces of the first and second reverse curvature parts ICV1 and ICV2. Each of the bottom surface of the curved part CSP and the bottom surfaces of the first and second reverse curvature parts ICV1 and ICV2 may be a bottom surface of the display module DM, which is opposite surface of a front surface (e.g., a display surface) of the display module DM.

Since the adhesive layer ADH is not disposed on the curved part CSP, the curved part CSP may be further easily bent. Also, since the adhesive layer ADH is not disposed on the first and second reverse curvature parts ICV1 and ICV2, the first and second reverse curvature parts ICV1 and ICV2 may be further easily bent.

When the display module DM is folded, the first wing plate WPT1 may move toward the first inclined surface SLP1 to contact the first inclined surface SLP1 according to a stress of the folding area FA. When the display module DM is folded, the second wing plate WPT2 may move toward the second inclined surface SLP2 to contact the second inclined surface SLP2 according to the stress of the folding area FA.

According to the above-described folding structure, when the display module DM is folded, a gap GP between the first non-folding area NFA1 and the second non-folding area NFA2 may be less than a gap EGP between the first extension part EX1 and the second extension part EX2. The gap EGP between the first extension part EX1 and the second extension part EX2 may gradually increase in a direction toward the curved part CSP. Thus, when the display module DM is folded, the display module DM may be folded into a shape like a dumbbell.

Referring to FIG. 19C, when the display device DD is folded from the unfolded state such that the first and second bodies BD1 and BD2 rotate by about 90 degrees (°) in clockwise and counterclockwise directions, respectively, the folding area FA may not contact the central frame CFM. In an embodiment, when the display device DD is folded, the curved part CSP of the folding area FA may not contact the central frame CFM, for example.

Referring to FIGS. 18C and 19C, since the first and second gears GR1 and GR2 are disposed below the rotation pin units RPN1 and RPN2, the first and second rotation axes RX1 and RX2 may be disposed above the gear rotation axes GRX.

A position of the curved part CSP may be varied according to positions of the first and second rotation axes RX1 and RX2. When the folding set FST is disposed below the first and second rotation axes RX1 and RX2 and adjacent to the gear rotation axes GRX or overlaps the gear rotation axes GRX, the curved part CSP may move further downward to contact the central frame CFM. In this case, the curved part CSP may be damaged when the display device DD is repeatedly folded and unfolded.

However, in an embodiment of the invention, as the first and second rotation axes RX1 and RX2 are disposed higher than the gear rotation axes GRX, the curved part CSP may not contact the central frame CFM when the display device DD is folded. As a result, the curved part CSP may be prevented from being damaged.

Figure 20:
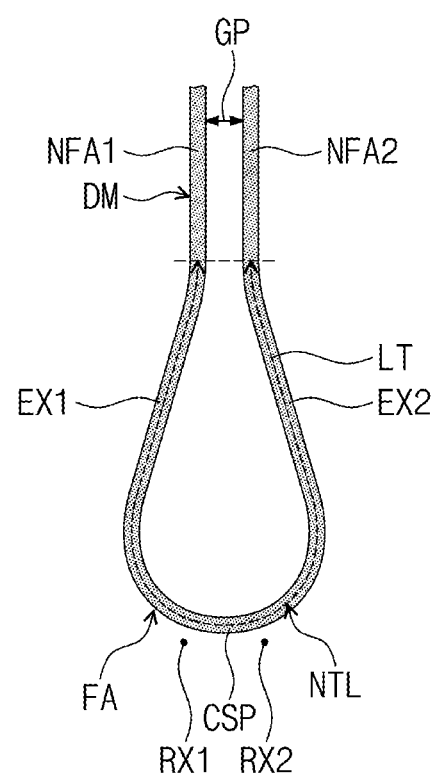
FIG. 20 is an enlarged view illustrating a display module in FIG. 19C.

FIG. 20 is an enlarged view illustrating the display module in FIG. 19C.

Referring to FIG. 20, when the display module DM is folded, the length L (refer to FIG. 19A) of the folding area FA may be defined as a length of a neutral surface NTL of the folding area FA. In an embodiment, a bottom surface of the folding area FA may be further expanded and a top surface of the folding area FA is further contracted when the folding area FA is bent than when the folding area FA is flat, for example. Thus, a tensile stress may be generated in the bottom surface of the folding area FA, and a compressive stress may be generated in the top surface of the folding area FA.

A portion at which the tensile stress and the compressive stress are cancelled out each other, and each of the tensile stress and the compressive stress is about zero may exist inside the folding area FA. The portion of the folding area FA, in which a stress is about zero, may be defined as the neutral surface NTL. In the neutral surface NTL, a length from a boundary between the folded folding area FA and the first non-folding area NFA1 to a boundary between the folded folding area FA and the second non-folding area NFA2 may be defined as the length L of the folding area FA.

More specifically, the length L of the folding area FA may be defined as a sum of a length of the neutral surface NTL of the curved part CSP and lengths of portions, which correspond to the neutral surface NTL of the curved part CSP, of the first and second extension parts EX1 and EX2. The neutral surface NTL of the curved part CSP may be defined as a portion of the curved part CSP, in which the tensile stress and the compressive stress of the curved part CSP are cancelled out each other, and each of the tensile stress and the compressive stress is about zero.

Figure 21:
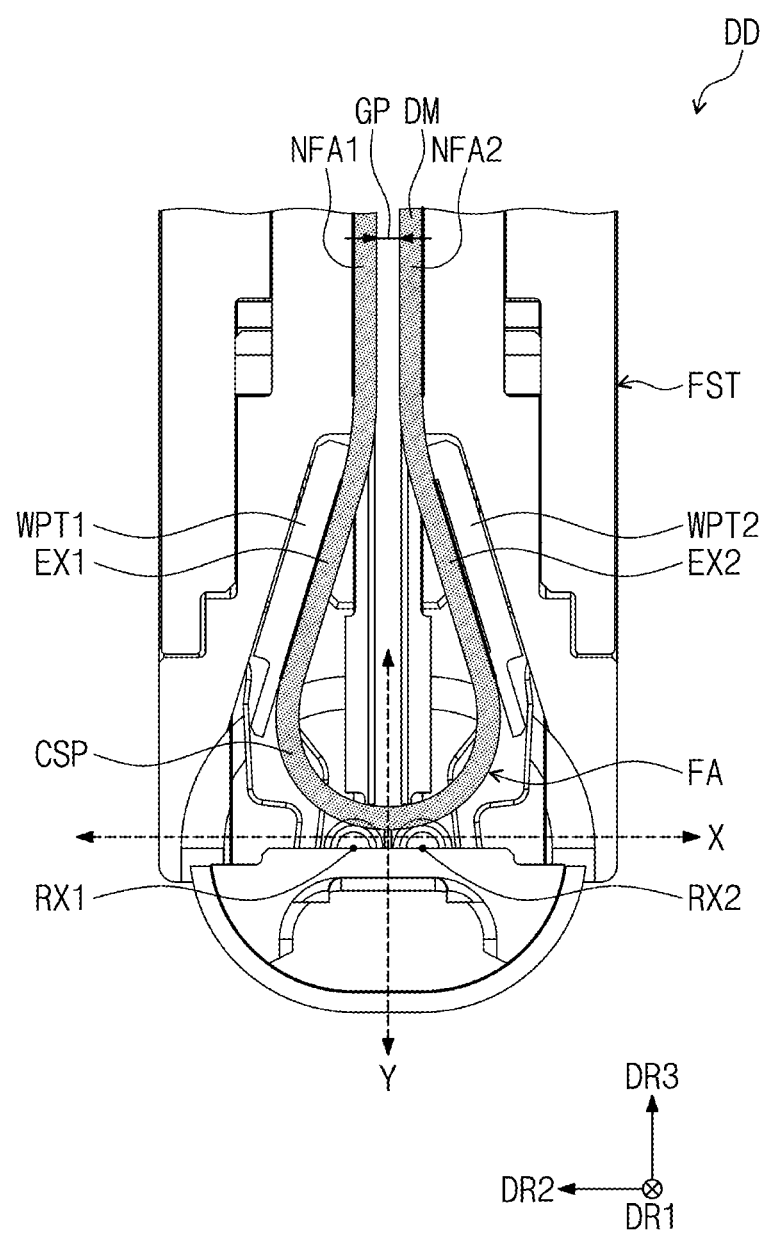
FIG. 21 is view obtained by adding an X-axis and a Y-axis to FIG. 19C.

FIG. 21 is view obtained by adding an X-axis and a Y-axis to FIG. 19C.

In an embodiment, some reference symbols are omitted in FIG. 21, for example.

Referring to FIG. 21, an X-axis X and a Y-axis Y are defined in the display device DD. The X-axis X may be parallel to the second direction DR2. The X-axis X may overlap the top surface of the unfolded display module DM. In an embodiment, the X-axis X may overlap the top surface of the display module DM in FIG. 19A, for example.

The Y-axis Y may extend from a center of the folding set FST in the third direction DR3. The top surface of the unfolded display module DM may have a plane defined by the first and second directions DR1 and DR2, and the Y-axis Y may be perpendicular to the top surface of the unfolded display module DM. The first rotation axis RX1 and the second rotation axis RX2 may be disposed at positions symmetrical with respect to the Y-axis Y.

When the X-axis X and the Y-axis Y are defined as described above, a coordinate of the second rotation axis RX2 may be determined. In an embodiment of the invention, the positions of the first rotation axis RX1 and the second rotation axis RX2 may be optimized. Hereinafter, the optimized positions of the first rotation axis RX1 and the second rotation axis RX2 will be explained.

Figure 22:
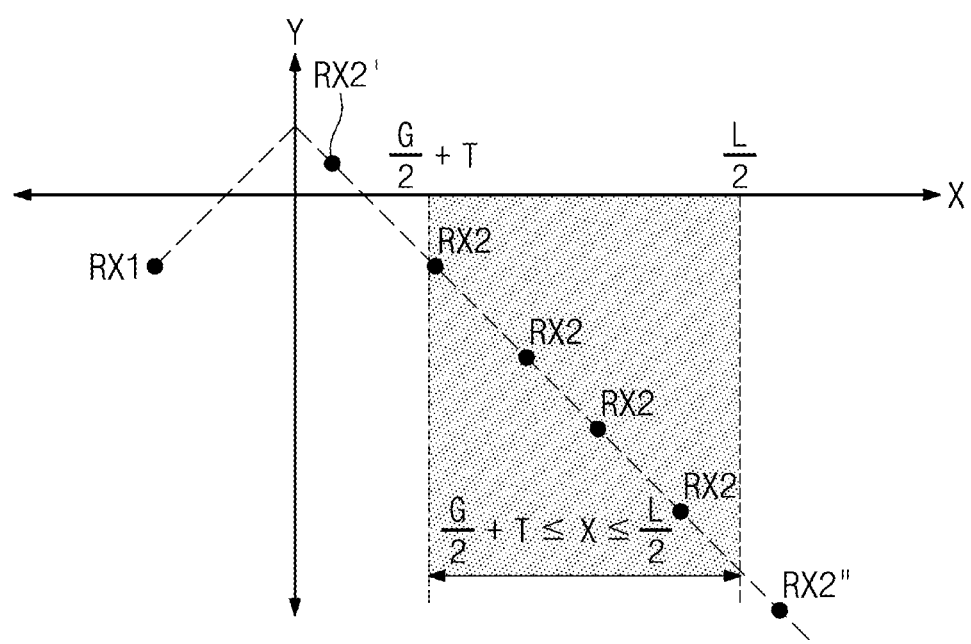
FIG. 22 is a graph showing X and Y coordinates of first and second rotation axes with respect to an X-axis and a Y-axis in FIG. 21.

FIG. 22 is a graph showing X and Y coordinates of the first and second rotation axes with respect to the X-axis and the Y-axis in FIG. 21.

Referring to FIG. 22, the positions of the first rotation axis RX1 and the second rotation axis RX2 may be varied with a predetermined range. In an embodiment, an X coordinate of the second rotation axis RX2 may be determined based on a mathematical equation below, for example.

$(G/2)+T \le X \le (L/2)$     [Mathematical equation 1]

Also, a Y coordinate of the second rotation axis RX2 may be determined based on a mathematical equation below.

$Y=-X+(G/2)$     [Mathematical equation 2]

In mathematical equation 1 and 2, G denotes a distance between the first non-folding area and the second non-folding area when the display module is folded, T denotes a thickness of the display module measured with respect to the Y-axis Y.

The X coordinate and the Y coordinate of the second rotation axis RX2 may be determined according to the above equation, and the X coordinate and the Y coordinate of the first rotation axis RX1 may be symmetric to those of the second rotation axis RX2. The X coordinate and the Y coordinate of the second rotation axis RX2 may have integer values.

When the positions of the first and second rotation axes RX1 and RX2 are determined according to the above equations, the display module DM may be normally folded to have a dumbbell shape. Hereinafter, positions of the first and second rotation axes RX1 and RX2, which satisfy conditions according to the above equations, are defined as normal positions.

When the rotation axes are disposed at positions deviated from the positions determined by the above equations, the display module DM may not be normally folded. Hereinafter, the abnormally folded structure will be described in FIGS. 23 to 27. First and second rotation axes RX1', RX2', RX1", and RX2" may be defined as rotations axes deviated from the normal positions.

Figure 23:
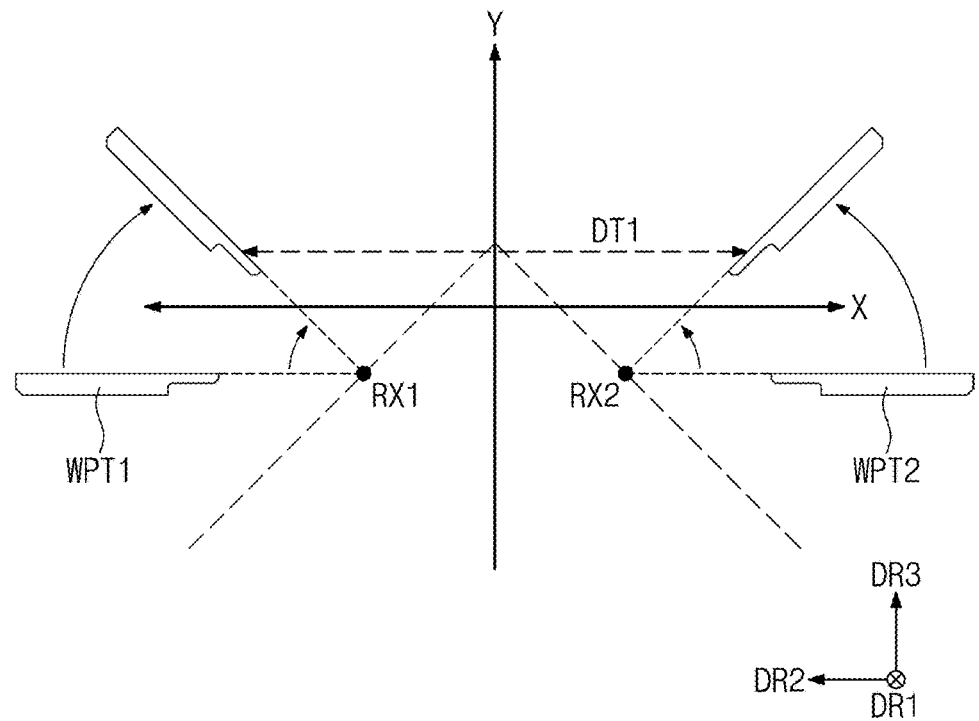
FIG. 23 is a view illustrating first and second wing plates rotating along the first and second rotation axes disposed at normal positions.

FIG. 23 is a view illustrating the first and second wing plates rotating along the first and second rotation axes disposed at the normal positions.

Referring to FIG. 23, the first wing plate WPT1 may rotate with respect to the first rotation axis RX1, and the second wing plate WPT2 may rotate with respect to the second rotation axis RX2. The second rotation axis RX2 in FIG. 23 may be adjacent to a left boundary of the X coordinate condition of the second rotation axis RX2 in FIG. 22. A distance between one portion of the first wing plate WPT1 and one portion of the second wing plate WPT2 in the second direction DR2 may be defined as a first distance DT1.

In an embodiment, FIG. 23 illustrates the first wing plate WPT1 rotating by about 45° with respect to the first rotation axis RX1 and the second wing plate WPT2 rotating by about 45° with respect to the second rotation axis RX2, for example. In this case, the display device DD may be folded by 45° as illustrated in FIG. 19B.

Figure 24:
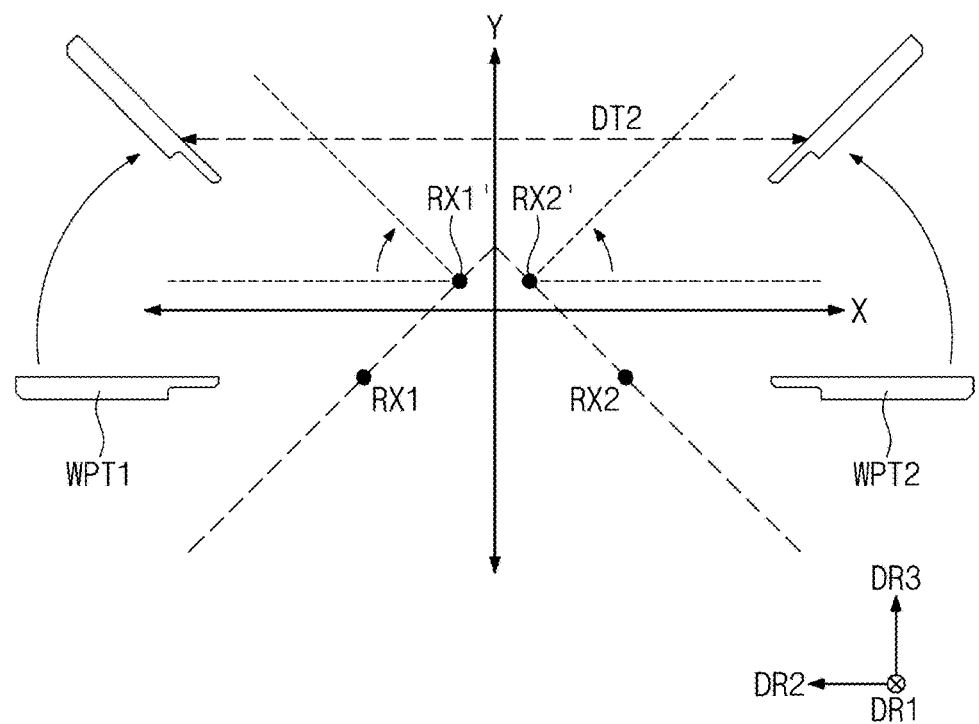
FIGS. 24 and 25 are views illustrating the first and second wing plates rotating along the first and second rotation axes deviated from the normal positions.
Figure 25:
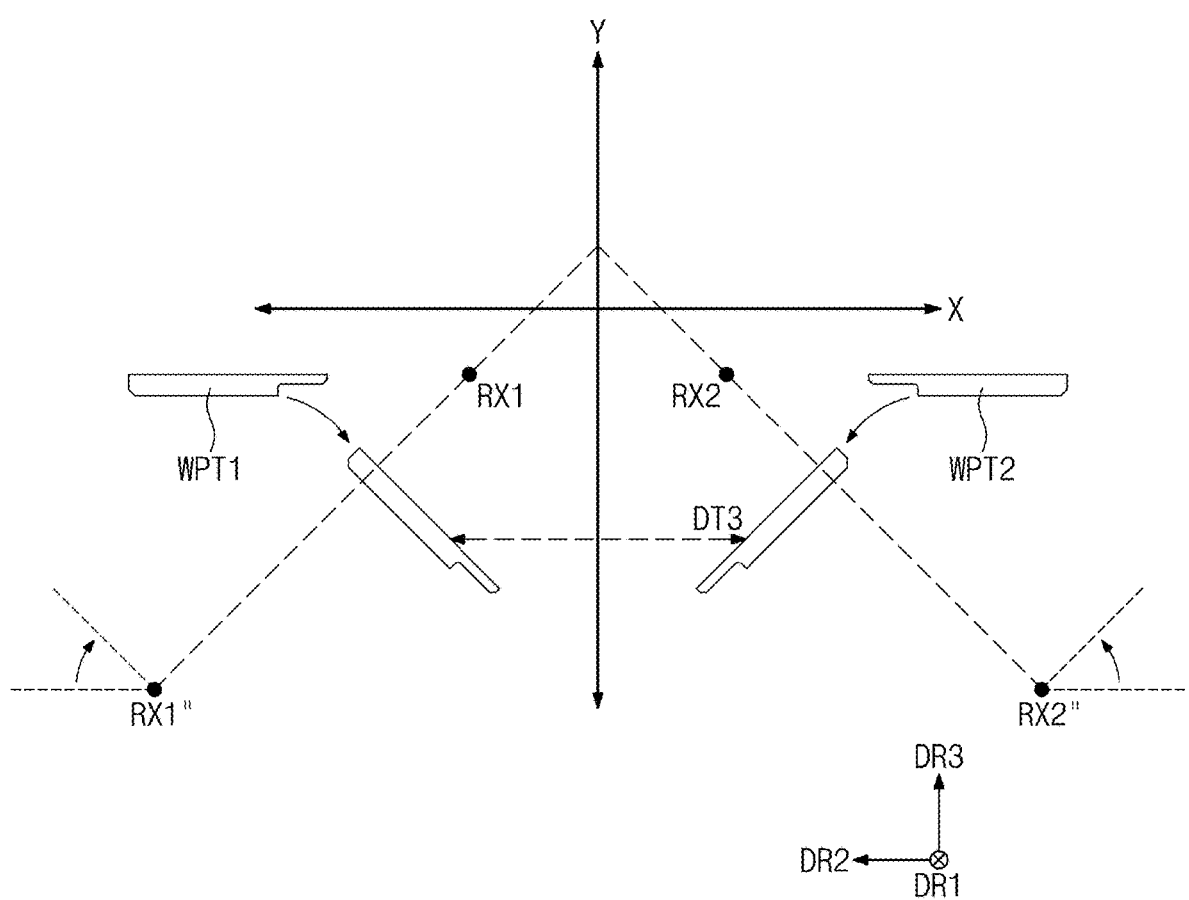
Figure 26:
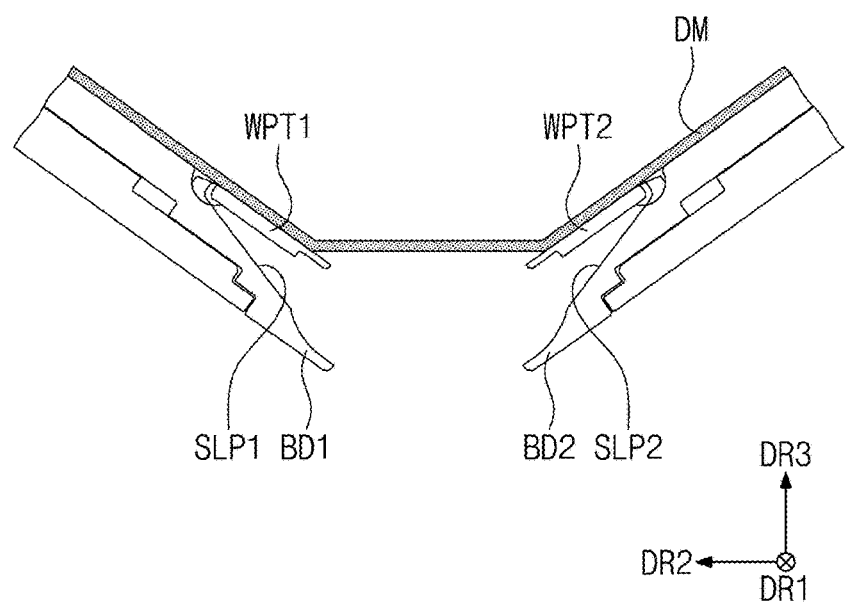
FIGS. 26 and 27 are views illustrating a state of the display device when the first and second wing plates rotating along the first and second rotation axes deviated from the normal positions in FIGS. 24 and 25.
Figure 27:
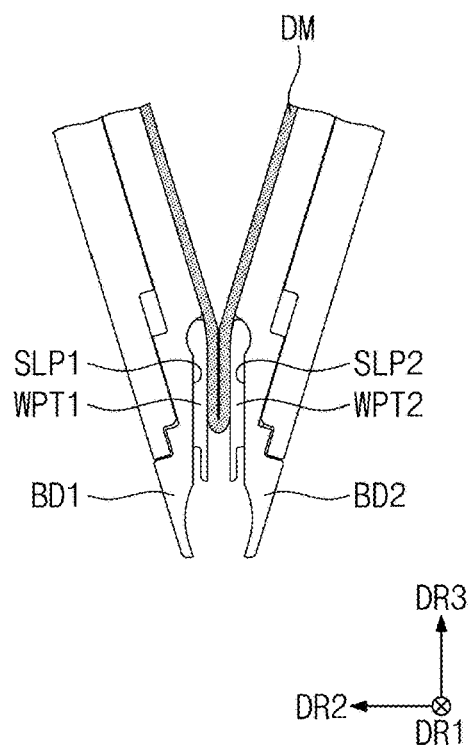

FIGS. 24 and 25 are views illustrating the first and second wing plates rotating along the first and second rotation axes deviated from the normal positions. FIGS. 26 and 27 are views illustrating a state of the display device when the first and second wing plates rotating along the first and second rotation axes deviated from the normal positions in FIGS. 24 and 25.

In an embodiment, only the first and second bodies BD1 and BD2, the first and second wing plates WPT1 and WPT2, for example, and the display module DM are illustrated in FIGS. 26 and 27 for simple illustration.

Referring to FIG. 24, a first rotation axis RX1' and a second rotation axis RX2' may be disposed closer to the Y-axis Y than the first rotation axis RX1 and the second rotation axis RX2 are to the Y-axis Y. The first wing plate WPT1 may rotate with respect to the first rotation axis RX1', and the second wing plate WPT2 may rotate with respect to the second rotation axis RX2'.

A distance between one portion of the first wing plate WPT1 and one portion of the second wing plate WPT2 in the second direction DR2 may be defined as a second distance DT2. The second distance DT2 may be greater than the first distance DT1.

In an embodiment, FIG. 24 illustrates the first wing plate WPT1 rotating by about 45° with respect to the first rotation axis RX1' and the second wing plate WPT2 rotating by about 45° with respect to the second rotation axis RX2', for example.

Referring to FIG. 25, a first rotation axis RX1" and a second rotation axis RX2" may be disposed farther from the Y-axis Y than the first rotation axis RX1 and the second rotation axis RX2 are from the Y-axis Y. The first wing plate WPT1 may rotate with respect to the first rotation axis RX1", and the second wing plate WPT2 may rotate with respect to the second rotation axis RX2".

A distance between one portion of the first wing plate WPT1 and one portion of the second wing plate WPT2 in the second direction DR2 may be defined as a third distance DT3. The third distance DT3 may be less than the first distance DT1.

In an embodiment, FIG. 25 illustrates the first wing plate WPT1 rotating by about 45° with respect to the first rotation axis RX1" and the second wing plate WPT2 rotating by about 45° with respect to the second rotation axis RX2", for example.

Referring to FIGS. 24 and 26, as described above, the second distance DT2 may be greater than the first distance DT1. Thus, when the first and second wing plates WPT1 and WPT2 rotate with respect to the first and second rotation axes RX1' and RX2', the first and second wing plates WPT1 and WPT2 may be further spaced from each other.

When the first and second wing plates WPT1 and WPT2 are further spaced from each other, the folding area FA may be further stretched, and a bending phenomenon of the display module DM may be generated as illustrated in FIG. 26.

Referring to FIGS. 25 and 27, as described above, the third distance DT3 may be less than the first distance DT1. Thus, when the first and second wing plates WPT1 and WPT2 rotate further than about 45° with respect to the first and second rotation axes RX1' and RX2', the first and second wing plates WPT1 and WPT2 may be further adjacent to each other.

When the first and second wing plates WPT1 and WPT2 are further adjacent to each other, the folding area FA may be further folded, and portions of the folding area FA may contact each other as illustrated in FIG. 27.

Thus, when the display device DD is folded with respect to the first and second rotation axes RX1' and RX2' and the first and second rotation axes RX1" and RX2" that are deviated from the normal range, the display module DM may not be normally folded to have the dumbbell shape. When the display device DD is folded with respect to the first and second rotation axes RX1 and RX2, the display module DM may be normally folded to have the dumbbell shape.

Resultantly, in an embodiment of the invention, as the first rotation axis RX1 and the second rotation axis RX2 of the hinge module HGM is optimized to fold the display module DM into the dumbbell shape, the display module DM may be further easily folded into the dumbbell shape.

Figure 28:
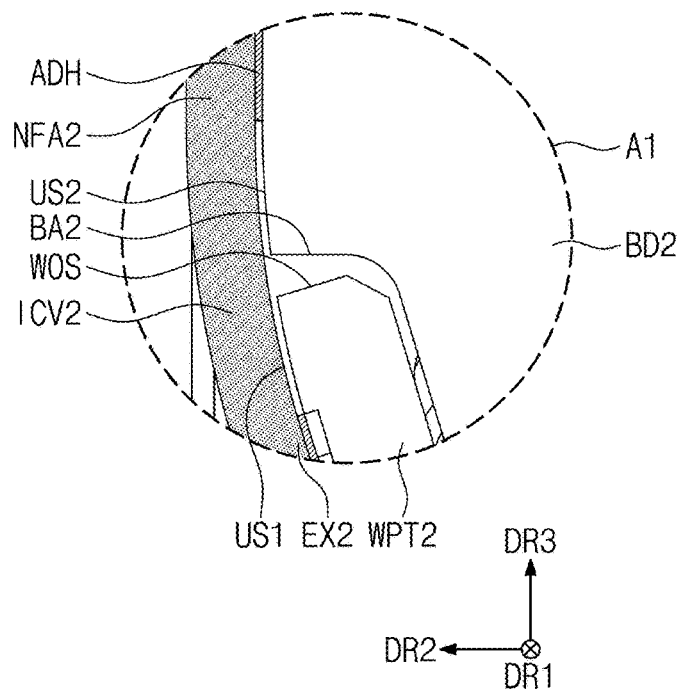
FIG. 28 is an enlarged view illustrating a first area A1 of FIG. 19C.
Figure 29:
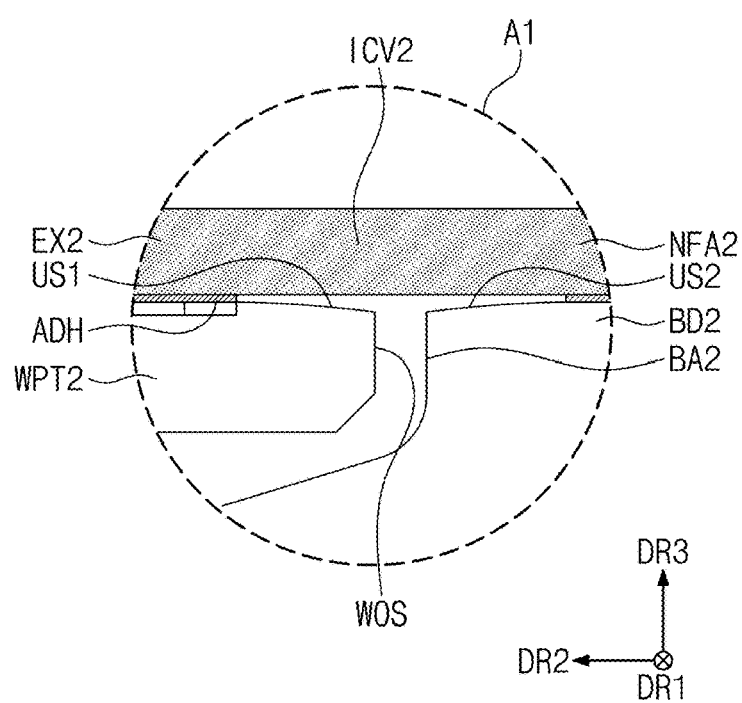
FIG. 29 is a view illustrating an unfolded state of a second reverse curvature part in FIG. 28.

FIG. 28 is an enlarged view illustrating a first area A1 of FIG. 19C. FIG. 29 is a view illustrating an unfolded state of the second reverse curvature part in FIG. 28.

FIG. 28 is a view illustrating peripheral components of the second reverse curvature part ICV2 when the display device DD is folded, and FIG. 29 is a view illustrating the peripheral components of the second reverse curvature part ICV2 when the display device DD is unfolded.

Although the peripheral components of the second reverse curvature part ICV2 are illustrated in FIGS. 28 and 29, peripheral components of the first reverse curvature part ICV1, which are not illustrated, may be substantially the same as the peripheral components of the second reverse curvature part ICV2.

Referring to FIGS. 28 and 29, each of a top surface of the second body BD2 and a top surface of the second wing plate WPT2, which are adjacent to each other, may have a curved surface. In an embodiment, each of a first top surface US1 of the second wing plate WPT2, which is adjacent to the second boundary BA2, and a second top surface US2 of the second body BD2, which is disposed below the second non-folding area NFA2 and adjacent to the second boundary BA2, may have a curved surface, for example.

Although not shown, each of a top surface of the first body BD1 and a top surface of the first wing plate WPT1, which are adjacent to each other, may have a curved surface. In an embodiment, each of a first top surface of the first wing plate WPT1, which is adjacent to the first boundary BA1, and a second top surface of the first body BD1, which is disposed below the first non-folding area NFA1 and adjacent to the first boundary BA1, may have a curved surface, for example.

The second boundary BA2 and a side WOS of the second wing plate WPT2, which is adjacent to the second boundary BA2, may be disposed adjacent to a central portion of the second reverse curvature part ICV2. Although not shown, the first boundary BA1 and a side of the first wing plate WPT1, which is adjacent to the first boundary BA1, may be disposed adjacent to a central portion of the first reverse curvature part ICV1.

As illustrated in FIG. 28, when the display module DM is folded, each of the curved surface of the first top surface US1 and the curved surface of the second top surface US2 may correspond to a bent curved surface of the second reverse curvature part ICV2. Each of the curved surface of the first top surface US1 and the curved surface of the second top surface US2 may have the substantially same curvature as the curved surface of the second reverse curvature part ICV2. Each of the curved surface of the first top surface US1 and the curved surface of the second top surface US2 may have the substantially same curvature as a bottom surface of the second reverse curvature part ICV2.

Although not shown, when the display module DM is folded, each of the first top surface of the first wing plate WPT1, which is adjacent to the first boundary BA1, and the second top surface of the first body BD1, which is adjacent to the first boundary BA1, may correspond to a bent curved surface of the first reverse curvature part ICV1.

Since the first and second top surfaces US1 and US2 have the curved surfaces, the second reverse curvature part ICV2 may be further easily bent along the first and second top surfaces US1 and US2.

Figure 30:
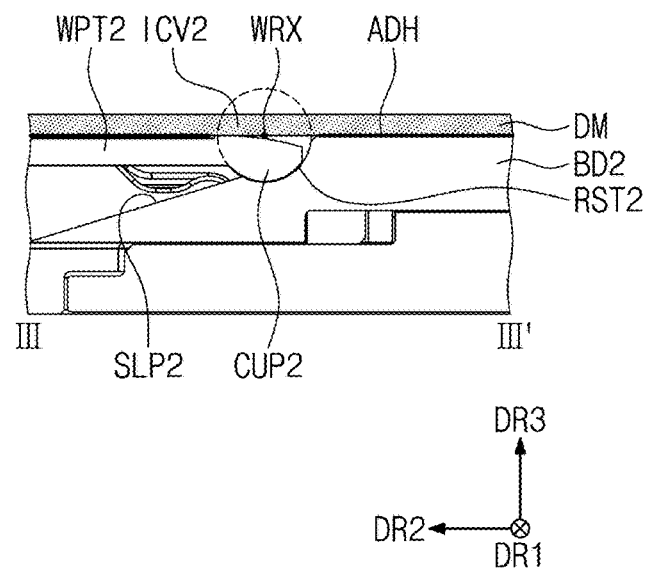
FIG. 30 is a cross-sectional view taken along line III-III' of FIG. 14.
Figure 31:
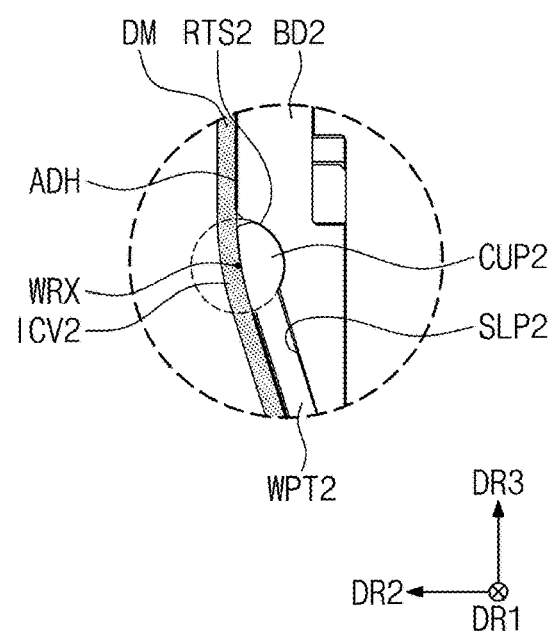
FIG. 31 is a view illustrating an unfolded state of the second reverse curvature part in FIG. 30.

FIG. 30 is a cross-sectional view taken along line III-III' of FIG. 14. FIG. 31 is a view illustrating an unfolded state of the second reverse curvature part in FIG. 30.

FIG. 30 is a view illustrating the peripheral components of the second reverse curvature part ICV2 when the display device DD is unfolded, and FIG. 31 is a view illustrating the peripheral components of the second reverse curvature part ICV2 when the display device DD is folded. In FIGS. 30 and 31, the display module DM is also illustrated. Also, the peripheral components of the second reverse curvature part ICV2 in FIG. 30 are simply illustrated in a circular dotted line in FIG. 31.

Although the peripheral components of the second reverse curvature part ICV2 are illustrated in FIGS. 30 and 31, the peripheral components of the first reverse curvature part ICV1, which are not illustrated, may be substantially the same as the peripheral components of the second reverse curvature part ICV2.

Hereinafter, FIGS. 9 and 14 will be described together as necessary.

Referring to FIGS. 9, 14, 23, and 24, the second rotation surface RTS2 defined in the second body BD2 may have a concave curved shape. Although not shown, the first rotation surface RTS1 defined in the first body BD1 may also have a concave curved shape.

The second coupling part CUP2 of the second wing plate WPT2 may have a convex curved shape and contact the second rotation surface RTS2. The second coupling part CUP2 may have the substantially same curvature as the second rotation surface RTS2. Although not shown, the first coupling part CUP1 of the first wing plate WPT1 may also have a convex curved shape and contact the first rotation surface RTS1.

A center point of a circle defined by a curved surface of the second coupling part CUP2 may be defined as a wing rotation axis WRX. When the display module DM is folded, the second coupling part CUP2 may move and rotate along a curved surface of the second rotation surface RTS2. That is, when the display module DM is folded, the second coupling part CUP2 may rotate along the wing rotation axis WRX.

Although not shown, when the display module DM is folded, the first coupling part CUP1 may also rotate along the wing rotation axis WRX adjacent to the first rotation surface RTS1 to move and rotate along a curved surface of the first rotation surface RTS1.

The display module DM and the above-described bezel cover BZC may be disposed on the first and second wing plates WPT1 and WPT2 to fix the first and second wing plates WPT1 and WPT2. Thus, the first and second coupling parts CUP1 and CUP2 may be easily disposed on the first and second rotation surfaces RTS1 and RTS2 instead of being separated from the first and second rotation surfaces RTS1 and RTS2.

According to the above-described structure, the first and second coupling parts CUP1 and CUP2 may rotate by easily contacting the first and second rotation surfaces RTS1 and RTS2 instead of using pins for coupling the first and second coupling parts CUP1 and CUP2 to the first and second bodies BD1 and BD2.

According to the embodiment of the invention, as the first rotation axis and the second rotation axis are optimized to fold the display module into the dumbbell shape, the display module may be further easily folded into the dumbbell shape.

Although the embodiments of the invention have been described, it is understood that the invention should not be limited to these embodiments but various changes and modifications may be made by one ordinary skilled in the art within the spirit and scope of the invention as hereinafter claimed. Thus, to the maximum extent allowed by law, the scope of the invention is to be determined by the broadest permissible interpretation of the following claims and their equivalents, and shall not be restricted or limited by the foregoing detailed description.

What is claimed is:

1. A display device comprising:
a display module comprising a first non-folding area, a second non-folding area, and a folding area between the first and second non-folding areas; and
a folding set disposed on a first surface of the display module and defining a first rotation axis and a second rotation axis, which each extend in a first direction,
wherein the folding area and the first and second non-folding areas are arranged in a second direction crossing the first direction, and a first axis parallel to the second direction and overlapping a second surface of the display module opposite to the first surface of the display module and a second axis perpendicular to the surface of the display module at a center of the folding set are defined,
wherein a first coordinate of the second rotation axis is determined by an equation below:

$(G/2)+T \leq X \geq (L/2),$ wherein X denotes the first coordinate, G denotes a distance between the first non-folding area and the second non-folding area when the display module is folded, T denotes a thickness of the display module measured with respect to the second axis, and L denotes a length of the folding area with respect to the second direction, wherein when the display module is unfolded, the first and second rotation axes overlap a second surface of the display module opposite to the first surface of the display module, and when the display module is folded, the folding area is disposed above the first and second rotation axes.

2. The display device of claim 1, wherein the first rotation axis and the second rotation axis are disposed on the second surface of the display module.

3. The display device of claim 1, wherein the first rotation axis is symmetrical to the second rotation axis with respect to the second axis.

4. The display device of claim 1, wherein a second coordinate of the second rotation axis is determined by an equation below:

$X=-X+(G/2),$ wherein Y denotes the second coordinate.

5. The display device of claim 1, wherein when the folding set rotates with respect to the first rotation axis and the second rotation axis, as the folding area is bent, the display module is in-folded.

6. The display device of claim 1, wherein when the display module is folded, the length L is set as a length of a neutral surface of the folding area, and the neutral surface is defined as a portion in which each of a compressive stress of the folding area and a tensile stress of the folding area is about zero.

7. The display device of claim 1, wherein the folding set comprises:
a first body overlapping the first non-folding area;
a second body overlapping the second non-folding area;
a plurality of bracket bodies connected to the first and second bodies;
a plurality of rotation pin units connected to the plurality of bracket bodies, extending in the first direction, the plurality of rotation pin units providing the first and second rotation axes to the first and second bodies, respectively; and
a plurality of gears spaced apart from the plurality of rotation pin units and extending in the first direction, the plurality of gears rotates in conjunction with the plurality of rotation pin units.

8. The display device of claim 7, wherein the plurality of gears is disposed on sides of the plurality of rotation pin units opposite to the display module, and the first and second bodies rotate with respect to the first and second rotation axes, respectively.

9. The display device of claim 7, wherein the plurality of gears comprises:
a plurality of first gears extending in the first direction and engage with each other in the second direction; and
a plurality of second gears extending in the first direction and arranged with the plurality of first gears therebetween,
wherein the plurality of first gears and the plurality of second gears are engaged with each other in the second direction and rotate with respect to gear rotation axes parallel to the first direction.

10. The display device of claim 9, further comprising a plurality of bracket cams including first sides coupled to the plurality of second gears and rotating in conjunction with the plurality of second gears and second sides protruding in the first direction and disposed in guide grooves defined in the plurality of bracket bodies, the guide grooves extend in the second direction, and
when the plurality of rotation pin units rotates, the second sides of the plurality of bracket cams move along the guide grooves.

11. The display device of claim 7, wherein the folding area comprises:
a curved part bent to have a predetermined curvature when the display module is folded;
a first extension part disposed between the first non-folding area and the curved part; and
a second extension part disposed between the second non-folding area and the curved part.

12. The display device of claim 11, wherein the length L is defined as a sum of a length of a neutral surface of the curved part and lengths of portions, which correspond to the neutral surface of the curved part, of the first and second extension parts, and the neutral surface is defined as a portion in which each of a compressive stress of the curved part and a tensile stress of the curved part is about zero.

13. The display device of claim 11, wherein when the display module is folded, a distance between the first non-folding area and the second non-folding area is less than that between the first extension part and the second extension part.

14. The display device of claim 11, wherein the first body overlaps the first extension part, and the second body overlaps the second extension part,
a surface of the first body, which faces the first extension part, includes a first inclined surface, and a surface of the second body, which faces the second extension part, includes a second inclined surface, and
heights of the first and second inclined surfaces gradually decrease in a direction toward a first side of the first body and a first side of the second body facing each other.

15. The display device of claim 14, further comprising:
a first wing plate disposed between the first extension part and the first inclined surface and rotatably coupled to a first boundary between a flat surface of the first body facing the first non-folding area and the first inclined surface; and a second wing plate disposed between the second extension part and the second inclined surface and rotatably coupled to a second boundary between a flat surface of the second body facing the second non-folding area and the second inclined surface, wherein when the display module is folded, the first and second wing plates contact the first and second inclined surfaces, respectively.

16. The display device of claim 15, further comprising an adhesive layer disposed:

between the first and second non-folding areas and the first and second bodies; and between the first and second extension parts and the first and second wing plates.

17. The display device of claim 16, wherein when the display module is folded, the display module further comprises:

a first reverse curvature part defined as a portion of the display module between the first non-folding area and the first extension part and bent in a direction opposite to the curved part; and a second reverse curvature part defined as a portion of the display module between the second non-folding area and the second extension part and bent in a direction opposite to the curved part.

18. The display device of claim 17, wherein the adhesive layer is not disposed on a surface of the curved part facing the folding set and surfaces of the first and second reverse curvature parts facing the folding set.

19. A display device comprising:

a display module comprising a first non-folding area, a folding area, and a second non-folding area, which are arranged in a second direction crossing a first direction; and a folding set disposed on a first surface of the display module and defining a first rotation axis and a second rotation axis, which each extend in the first direction and are spaced apart from each other in the second direction, wherein a first axis parallel to the second direction and overlapping a second surface of the display module opposite to the first surface of the display module and a second axis perpendicular to the surface of the display module at a center of the folding set are defined, and the first rotation axis is symmetrical to the second rotation axis with respect to the second axis, wherein a first coordinate and a second coordinate of the second rotation axis are determined by equations below:

$(G/2)+T \leq X \leq (L/2)$; and $Y=-X+(G/2)$, wherein X denotes the first coordinate, G denotes a distance between the first non-folding area and the second non-folding area when the display module is folded, T denotes a thickness of the display module measured with respect to the second axis, L denotes a length of the folding area with respect to the second direction, and Y denotes the second coordinate, wherein when the display module is unfolded, the first and second rotation axes overlap a second surface of the display module opposite to the first surface of the display module, and when the display module is folded, the folding area is disposed above the first and second rotation axes.

20. The display device of claim 19, wherein when the display module is folded, the length L is set as a length of a neutral surface of the folding area of the display module disposed between the first non-folding area and the second non-folding area, and the neutral surface is defined as a portion in which each of a compressive stress of the folding area and a tensile stress of the folding area is about zero.

* * * * *